(12) United States Patent
Yuan et al.

(10) Patent No.: US 7,899,785 B2
(45) Date of Patent: *Mar. 1, 2011

(54) RECONFIGURING PROPAGATION STREAMS IN DISTRIBUTED INFORMATION SHARING

(75) Inventors: Jun Yuan, Foster City, CA (US); Alan Downing, Fremont, CA (US); Lik Wong, Union City, CA (US); Nimar Arora, Union City, CA (US); Patricia H. McElroy, Santa Clara, CA (US); Byron Wang, Mountain View, CA (US); Lei Gao, Foster City, CA (US); Anand Lakshminath, Fremont, CA (US); Ramkumar Venkatesan, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 302 days.

This patent is subject to a terminal disclaimer.

(21) Appl. No.: 11/831,798

(22) Filed: Jul. 31, 2007

(65) Prior Publication Data

US 2009/0037442 A1 Feb. 5, 2009

(51) Int. Cl.
*G06F 17/30* (2006.01)
(52) U.S. Cl. ......... 707/616; 707/641; 707/651; 707/656; 707/999.2
(58) Field of Classification Search .......... 707/1, 2, 707/6, 10, 100, 101, 102, 200, 616, 641, 707/651, 656, 999.2; 709/208, 238, 226; 717/125, 208

See application file for complete search history.

(56) References Cited

U.S. PATENT DOCUMENTS

| | | | |
|---|---|---|---|
| 4,408,273 A | 10/1983 | Plow | |
| 5,012,468 A | 4/1991 | Siegel et al. | |
| 5,515,502 A | 5/1996 | Wood | |
| 5,596,706 A | 1/1997 | Shimazaki et al. | |
| 5,649,195 A | 7/1997 | Scott et al. | |
| 5,649,196 A | 7/1997 | Woodhill et al. | |
| 5,710,922 A | 1/1998 | Alley et al. | |
| 5,758,359 A | 5/1998 | Saxon | |
| 5,768,532 A | 6/1998 | Megerian | |
| 5,778,395 A | 7/1998 | Whiting et al. | |

(Continued)

OTHER PUBLICATIONS

Dye, Charles, "Multi-Master Replication," Oracle Distributed Systems, Chapter 12, O'Reilly and Associates, Apr. 1999, 54 pages.

(Continued)

*Primary Examiner* — Marc R Filipczyk
(74) *Attorney, Agent, or Firm* — Hickman Palermo Truong & Becker LLP

(57) ABSTRACT

Splitting and merging database object information sharing streams. Streams are also referred to herein as "propagations". Splitting and merging information sharing streams can be used to improve performance in a information sharing environment when a failed or slow DBS impacts the performance. In one embodiment, an auto split process monitors the progress of applying changes at each node and detects the presence of a failed or a slow node. Once the failed or slow node is identified, the auto split process splits the propagation such that the offending node is sent through a separate propagation. Furthermore, an auto merge process can be started to monitor the newly created separate propagation. At a later point, the new propagation can be merged back into the original stream. For example, if the offending node catches up with other nodes, the auto merge process merges the newly created propagation back to the original propagation.

34 Claims, 16 Drawing Sheets

U.S. PATENT DOCUMENTS

| | | | |
|---|---|---|---|
| 5,829,001 A | 10/1998 | Li et al. | |
| 5,862,325 A | 1/1999 | Reed et al. | |
| 5,928,345 A * | 7/1999 | Tetzlaff et al. | 709/208 |
| 5,949,876 A | 9/1999 | Ginter et al. | |
| 6,014,669 A | 1/2000 | Slaughter et al. | |
| 6,038,563 A | 3/2000 | Bapat et al. | |
| 6,112,315 A | 8/2000 | Kuruvila et al. | |
| 6,256,773 B1 | 7/2001 | Bowman-Amuah | |
| 6,381,627 B1 | 4/2002 | Kwan et al. | |
| 6,496,949 B1 | 12/2002 | Kanevsky et al. | |
| 6,498,846 B1 | 12/2002 | Orui | |
| 6,785,224 B2 | 8/2004 | Uematsu et al. | |
| 6,876,643 B1 | 4/2005 | Aggarwal et al. | |
| 7,035,269 B2 | 4/2006 | Rolston et al. | |
| 7,139,692 B2 * | 11/2006 | Cohen et al. | 703/21 |
| 7,272,635 B1 | 9/2007 | Longtin et al. | |
| 7,295,776 B2 | 11/2007 | Okubo et al. | |
| 7,379,480 B2 | 5/2008 | Balasubramanian et al. | |
| 7,457,236 B2 | 11/2008 | Cheng et al. | |
| 7,523,110 B2 | 4/2009 | Holenstein et al. | |
| 7,627,858 B2 * | 12/2009 | Rose et al. | 717/125 |
| 7,702,741 B2 * | 4/2010 | Yuan et al. | 709/208 |
| 2002/0147733 A1 | 10/2002 | Gold et al. | |
| 2009/0037553 A1 * | 2/2009 | Yuan et al. | 709/209 |

OTHER PUBLICATIONS

Mahapatra, Tushar et al., "Maintaining a Failover Database", Oracle Parallel Processing, Section 12.1, ProQuest Information and Learning, O'Reilly and Associates, Aug. 2000, 6 pages.

* cited by examiner

RECONFIGURING PROPAGATION STREAMS IN DISTRIBUTED INFORMATION SHARING

RELATED APPLICATIONS

This application is related to U.S. patent application Ser. No. 11/831,810, entitled "CONFIGURING OR RECONFIGURING A MULTI-MASTER INFORMATION SHARING ENVIRONMENT", by inventors YUAN ET AL., filed on the same date as this application, the content of which is incorporated herein in its entirety, for all purposes; and This application is related to U.S. patent application Ser. No. 11/247,973 entitled "RECOVERABLE EXECUTION", by inventors LAKSHMINATH ET AL., filed on Oct. 10, 2005, the content of which is incorporated herein in its entirety, for all purposes; and This application is related to U.S. Pat. No. 7,039,669, entitled "TECHNIQUES FOR ADDING A MASTER IN A DISTRIBUTED DATABASE WITHOUT SUSPENDING DATABASE OPERATIONS AT EXTANT MASTER SITES, by Wong et al., the content of which is incorporated herein in its entirety, for all purposes.

FIELD OF THE INVENTION

The present invention relates to information sharing systems. In particular, embodiments of the present invention relate to replicating database objects in a group of nodes.

BACKGROUND OF THE INVENTION

Replication is the process of sharing database objects and changes to those objects among multiple databases. As examples, the changes may be data manipulation changes ("DML changes") or data definition changes ("DDL changes") made by a database server. A typical log-based replication system involves at least two databases—a source database and a destination database, and has at least three components—a capture process to read changes from log files at a source database, a propagation process to send changes to a destination database, and an apply process to consume the changes at the destination database.

The term "capture" or "capture events" is used herein to refer to selecting events (e.g., changes) and adding messages to a staging area for subsequent processing. A capture process scans a redo log for DML or DDL changes and stages them into a queue for subsequent propagation to other database servers. The queued messages are captured and propagated to other database servers according to rules provided by the user.

The phrase "propagate a message" is used herein to refer to the activity of distributing messages generated by a capture process to other nodes for subsequent processing. The other node may be another database server, but is some cases could be the same database server. Message propagation may entail distributing messages from a staging area for one node to another staging area for subsequent processing at another node. A propagation process propagates messages. Propagating an event refers to propagating a message about the event.

FIG. 1 is a block diagram depicting an example replication environment used to propagate database changes among a network of database servers. Referring to FIG. 1, it shows messaging system 101. Messaging system 101 includes three nodes, database server New York, database server Pittsburgh, and database server Chicago. Database server New York has a table sales. DML and DDL changes (e.g., updates, deletes, and inserts) made by database server New York are propagated via messaging system 101 to database servers Pittsburgh and Chicago so that changes may be reflected in their respective tables sales (not shown).

Database servers Pittsburgh and Chicago do not receive all DDL and DML changes made to table sales in database server New York. The particular changes propagated to database servers Pittsburgh and Chicago depend on the value of a column city (not shown). Changes to rows where the value of city equals 'Pittsburgh' are propagated to database server Pittsburgh; changes to rows where the value of city equals 'Chicago' are propagated to database server Chicago.

A capture process 103 captures changes to table sales at database server New York and, for each change, adds a message to message queue 105. Capture process 103 captures the changes by scanning a redo log (not shown) maintained by database server New York. A redo log contains records that specify changes to rows in tables maintained by database server New York. Capture process 103 scans the redo log for records specifying changes to rows in table sales, adding a message to message queue 105 for changes to a particular row.

Propagate process 107 propagates messages queued in message queue 105 to database server Pittsburgh and propagate process 113 propagates messages queued in message queue 105 to database server Chicago. Messages reflecting changes to a row having city value equal to 'Pittsburgh' are propagated to database server Pittsburgh. Messages reflecting changes to a row having a city value equal to 'Chicago' are propagated to database server Chicago.

Apply processes 155 and 156 apply the propagated changes in the servers in Pittsburgh and Chicago. The term apply process refers to a process for reading messages in a staging area, such as a queue message queue 223, and causing the database server to take some action to reflect the event described by a message. For example, a message in message queue 223 that reflects a DML change made to a table in database server New York is applied to database server Chicago by making a corresponding change to a corresponding table in database server New York. Applying an event or change refers to applying a message about the event. Processes that capture, propagate, or apply events are referred to herein as message flow processes or flow processes.

Rules are used to decide what changes to capture and what messages to propagate. To determine what changes to what particular rows are captured, capture process 103 executes capture rules 109. The condition for a rule in capture rules 109 is expressed as a SQL expression that can reference a variable specifying the "source table" affected by a change or a column of the table. The following predicate expression is used in a rule to capture changes to source table sales.

source_table="sales"

Propagate processes 107 and 113 evaluate propagate rules 111 and 115, respectively, to determine how to propagate a message from message queue 105. A rule condition that specifies to propagate to database server Pittsburgh messages reflecting changes to a row with city value equal to 'Pittsburgh' may be expressed using the following predicate expression.

source_table="sales" AND city="Pittsburgh"

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
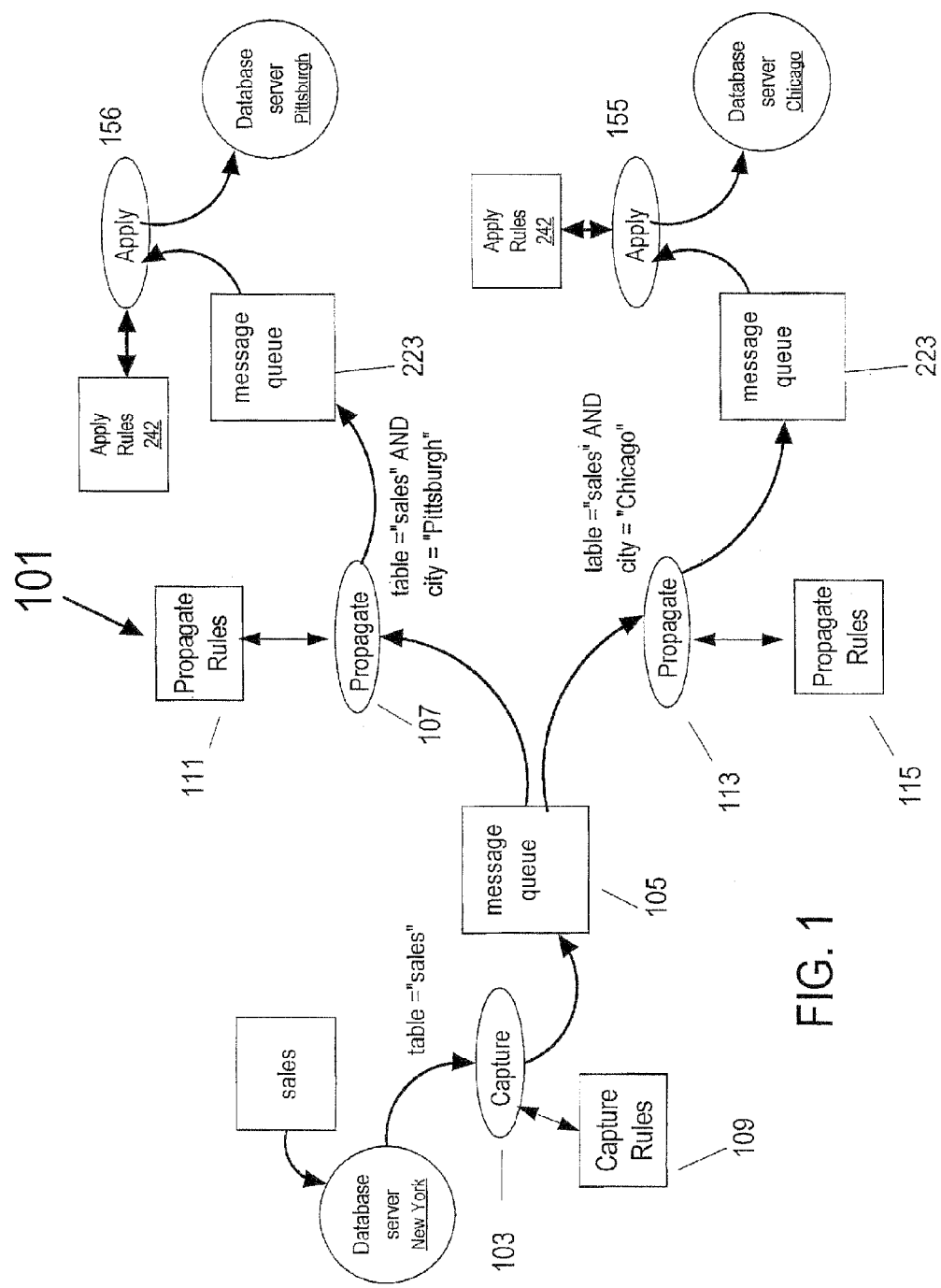
FIG. 1 is a block diagram depicting an example replication environment used to propagate database changes among a network of database servers.

A method and system are described for sharing electronic information. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques for configuring an n-way multi-master information sharing topology are described herein. The n-way multi-master topology can also be referred to as a peer-to-peer information sharing topology, in which co-master nodes replicate changes that are sent from every other co-master node. The information sharing topology can also have non-master nodes that only replicate changes sent from one of the master nodes. Examples are provided herein in which the nodes are database servers (DBSs); however, the nodes are not limited to being DBSs.

Application Program Interfaces (APIs) in accordance with embodiments of the present invention support configuring master DBSs and non-master DBSs in an information sharing topology. The APIs can configure an arbitrary topology. In one embodiment, a database administrator can invoke an API from a source DBS to set up an n-way multi-master configuration with an arbitrary number of destination DBSs. APIs in accordance with embodiments of the present invention can be used to promote a non-master DBS to a master DBS. APIs in accordance with embodiments of the present invention can be used to downgrade a master DBS to a non-master DBS.

Adding a new node (e.g., DBS) to the information sharing topology is implemented as follows, in an embodiment. Initially, the new node is added as a slave of a particular one of the co-masters. A capture process is created on the particular co-master to send changes to the objects to the slave. Furthermore, the objects to replicate are instantiated on the new node by propagating data from the particular co-master to the new node. Meanwhile, the co-masters continue to propagate changes to each other. Eventually, the new node may be made a co-master.

Promoting a slave node to a master node is implemented as follows, in an embodiment. Initially, the node is designated as a slave of a particular one of the co-masters. As a slave, the node receives changes from only the particular master. Meanwhile, the co-masters propagate changes to each other. To promote the slave to a master, changes to objects stored at the slave are propagated to each of the co-masters. Furthermore, changes at each of the masters are propagated to the promoted node.

APIs in accordance with an embodiment can enhance performance of the configuration. For example, a particular DBS configured as a new master DBS might significantly lag behind the co-master DBSs with respect to applying changes. Were no steps to be taken to alleviate the problem, each co-master DBS could be forced to re-mine a large number of data from log files, thus impacting performance. However, the APIs can be used to downgrade a particular DBS from a master DBS to a non-master DBS such that it does not impact the other master DBSs. Eventually, the particular DBS can be promoted back to a master DBS. Furthermore, an arbitrary number of DBSs can be added into or removed from an n-way multi-master information sharing topology.

Techniques for splitting and merging database object information sharing streams are described herein. Streams are also referred to herein as "propagations". Splitting and merging information sharing streams can be used to improve performance in an information sharing environment when a failed or slow DBS or network impacts the performance. In one embodiment, an auto split process monitors the progress of applying changes at each node and detects the presence of a failed or a slow node. Once the failed or slow node is identified, the auto split process splits the propagation such that the offending node is sent by a separate propagation. Furthermore, an auto merge process can be started to monitor the newly created separate propagation. At a later point, the new propagation can be merged back into the original stream. For example, if the offending node catches up with other nodes, the auto merge process merges the newly created propagation back to the original propagation.

In one embodiment, a user can invoke an API that automatically splits a propagation when appropriate. For example, the propagation is split when one of the DBSs applying changes is slow. Furthermore, the API automatically merges the split back together when appropriate.

In another embodiment, an API automatically splits the streams when appropriate. However, the split streams are not automatically merged. The split streams can be merged by the user invoking a PL/SQL procedure of the API, if desired.

In still another embodiment, an API automatically merges two streams regardless of whether or not the two were split at one point. As an example, the user might have invoked a procedure to split a stream. Then, the user invokes the API, which automatically merges two streams when a condition is met.

In one embodiment, shared objects can be added into an information sharing environment. For example, tables or schemas can be added to an information sharing environment. In accordance with one embodiment, adding an object ("new object") includes propagating, from a first node to a second node in the information sharing topology, a first stream that describes changes to information sharing objects at the first node. A second stream, which describes changes to the new object, is also propagated from the first node to the second node. Then, the propagation of the first stream and the second stream are stopped. Based on changes to the information sharing objects and changes to the new object that were applied at the second node at the point at which the first and second streams were stopped, a point at which to re-start the first stream is determined. Then, the first stream is re-configured to propagate changes at the first node to the new object in addition to changes to the information sharing objects. Next, the first stream is re-started to propagate, from the first node to the second node, changes to the new object and the information sharing objects.

Example N-Way Co-Master Information Sharing Topology

Figure 2A:
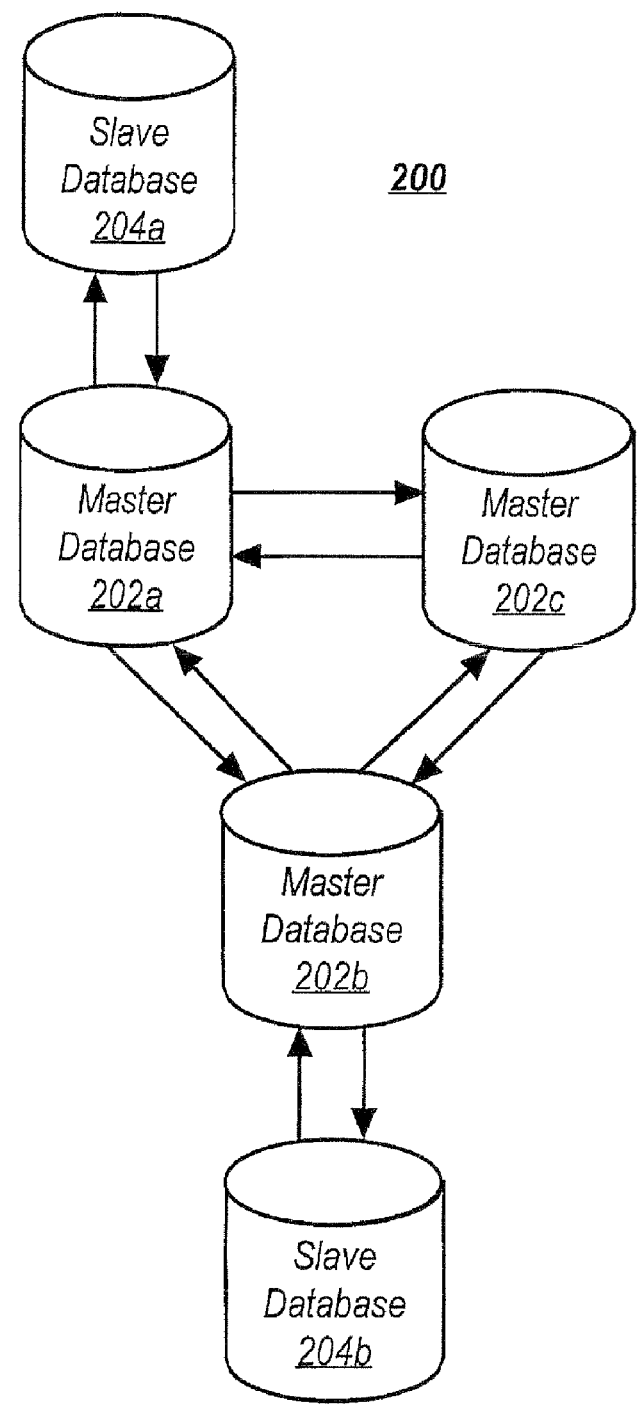
FIG. 2A depicts an example replication topology having several co-master database servers and several slave database servers, in accordance with an embodiment of the present invention.

FIG. 2A depicts an information sharing topology 200 having several co-master DBSs 202a-202c and several slave DBSs 204a-204b, in accordance with an embodiment of the present invention. Each master DBS 202 propagates changes to every co-master DBS 202, which replicate those changes on the databases that they control. Each slave DBS 204 exchanges changes with one particular master DBS 202, in this embodiment. It is not required that a slave DBS 204 be allowed to make changes to information sharing objects. As previously discussed, for purposes of illustration DBSs are used as examples of nodes.

The particular master DBS of the slave DBS propagates the changes from all of the co-masters to its slave DBS 204 and from its slave DBS 204 to the other masters 202. For example, master DBS 202a propagates its own changes, as well as changes from the co-master DBSs 202b-202c to slave DBS 204a. Slave DBS 204a propagates its changes only to master DBS 202a, which propagates those changes on to the co-master DBSs 202b and 202c.

A master DBS 202 may apply the changes from its own slave DBS 204, then capture those changes, and propagate those captured changes. Propagating these captured changes is referred to as "apply forwarding". As an alternative, a master DBS 202 may use "queue forwarding." In queue forwarding, the changes from the slave DBS 204 that are applied at the master DBS 202 are not captured at master DBS 202. Instead, these changes are forwarded from the queue at the master DBS 202 to all other master DBSs 202.

Overview of Information Sharing Concepts

1) General Overview

A log capture process is an example of a capture process. However, capture processes are not limited to log capture processes. According to one embodiment, a log capture process is a process configured to read information stored in the log files of a DBS, and to store information into one or more staging areas based on the information in the log files. Such log files may include, for example, the redo log files that are generated by the database system to record changes that are being made by the database system.

With respect to capturing changes, users can configure a background log capture process to capture changes made to tables, schemas, or the entire database. According to one embodiment, a log capture process captures changes from the redo log and formats each captured change into a "logical change record" (LCR). The database where changes are generated in the redo log is called the source database.

With respect to placing events into a queue, at least two types of events may be staged in a queue in the information sharing topology 200: LCRs and user messages. A capture process enqueues events into a queue that users specify. The queue can then share the events within the same database or with other databases. Users can also enqueue user events explicitly with a user application. These explicitly enqueued events can be LCRs or user messages.

With respect to propagating events from one queue to another, the queues may be in the same database or in different databases. With respect to dequeueing events, a background apply process can dequeue events. Users can also dequeue events explicitly with a user application.

With respect to applying events at a database, users can configure an apply process to apply all of the events in a queue or only the events that users specify. Users can also configure an apply process to call user-created subprograms (e.g. subprograms written in the PL/SQL language) to process events. The database where events are applied and other types of events are processed is called the destination database. In some configurations, the source database and the destination database may be the same.

2) Apply Process Overview

According to one embodiment, an apply process is a background process, running within a DBS, that dequeues events from a queue and either applies each event directly to a database object or passes the event as a parameter to a user-defined procedure called an apply handler. These apply handlers can include message handlers, DML handlers, DDL handlers, and procedure handlers.

According to one embodiment, an apply process is designed to be aware of transaction boundaries. For example, an apply process is aware of which changes, represented in the LCRs that the apply process is consuming, were initially made as part of the same transaction. The apply process assembles the changes into transactions, and applies the changes in a manner that takes into account the dependencies between the transactions. According to one embodiment, the apply process applies the changes in parallel, to the extent permitted by the dependencies between the transactions.

As mentioned above, LCRs are merely one example of the type of shared information that may be handled by an apply process. Apply processes may be configured to "apply" any form of shared information, including explicitly enqueued user messages and automatically captured data that is not organized as an LCR.

3) Oldest SCN

According to one embodiment, when the changes that are being applied are part of transactions, an acknowledge (ACK) message sent upstream by the apply process includes an OLDEST SCN (system change number) value. The OLDEST SCN is the oldest change SCN of LCRs of all uncommitted transactions. According to one embodiment, the OLDEST SCN value is persistently stored by the apply process, and periodically communicated upstream using ACK messages.

The oldest change SCN for a transaction will typically be the SCN associated with the first change made by the transaction. To maintain the OLDEST SCN up-to-date, the apply process may "raise" the OLDEST SCN when the transaction associated with the current OLDEST SCN is fully applied. For example, consider the follow three transactions:
   TX1 with changes at SCN 12, 13, 17, 20
   TX2 with changes at SCN 11, 14, 15, 18, 19 and 23
   TX3 with changes at SCN 16, 21, 22, 24 and 25.

If TX1, TX2 and TX3 are the only uncommitted transactions for which the apply process received changes, then the OLDEST SCN will be 11 (the oldest change SCN from any of the uncommitted transactions). Assume that the apply process first finishes applying TX1. At that point, the LAST COMMITTED SCN would be changed to 20, but the OLDEST SCN does not change, because TX1 was not the transaction associated with the OLDEST SCN.

If the apply process then finishes applying TX2, then the OLDEST SCN would be updated to 16, since the only uncommitted transaction would be TX3, and the oldest change SCN of TX3 is 16. At this point, the LAST COMMITTED SCN would also be changed to 23.

By maintaining the OLDEST SCN in this manner, all changes associated with change SCNs below the OLDEST SCN are guaranteed to have been applied. Thus, in the case of a failure, it is safe for the apply process to read the persistently stored OLDEST SCN, and to request the upstream components to resend the change information starting at the OLDEST SCN.

4) Low Watermark SCN

According to one embodiment, a LOW WATERMARK SCN is the SCN such that all transactions that have a commit SCN lower than or equal to the LOW WATERMARK SCN are guaranteed to have been applied. It is possible for the LOW WATERMARK SCN to be less than the commit SCN of the most recently applied transaction.

To maintain the LOW WATERMARK SCN up-to-date, the apply process "raises" the LOW WATERMARK SCN when (1) the apply process finishes applying a transaction that has a commit SCN that is above the current LOW WATERMARK SCN, and (2) no unapplied transaction has a commit SCN lower than or at the commit SCN of the transaction that has just been applied.

For example, assume that transactions TX1, TX2 and TX3 have commit SCNs of 17, 20 and 25, respectively. Assume that (1) TX1 has been applied, (2) the current LOW WATERMARK SCN is 17, and (3) the apply process applies TX3 before TX2. When TX3 is fully applied, the LOW WATERMARK SCN is not updated because an unapplied transaction (TX2) has a lower commit SCN than the commit SCN of TX3. After TX2 is applied, the LOW WATERMARK SCN is updated to 25, since all transactions with commit SCNs at or below 25 have been applied.

5) Above-Mark Applied Transactions

The already-applied transactions with commit SCNs above the LOW WATERMARK are referred to herein as the ABOVE-MARK APPLIED transactions. In the example given above, when TX3 was fully applied before TX2, TX3 became an ABOVE-MARK APPLIED transaction. According to one embodiment, in addition to the LOW WATERMARK SCN, the apply process persistently stores information about the ABOVE-MARK APPLIED transactions. According to one embodiment, the information about the ABOVE-MARK APPLIED transactions is maintained in a hash table in volatile memory, and the hash table is backed up on persistent storage.

6) Positive Rule Sets and Negative Rule Sets

According to an embodiment of the present invention, a message flow process processes rule sets as positive rule sets or negative rule sets when using rules to determine how to process an LCR. A message flow process may use a positive rule set, negative rule set, or a combination thereof, to determine whether or not to keep or discard an LCR. The meaning of the terms "keep an LCR" or "discard an LCR" depends on whether it is being used within the context of a capture, propagation, or apply process. For a capture process, an LCR is kept by adding it to a message queue; for a propagation process, the LCR is kept by propagating it; for an apply process, the LCR is kept by applying it. An LCR that is not kept is referred to as being discarded.

For positive rule sets, if the rule set evaluates to TRUE, then the flow process keeps the LCR. Thus, if any rule in a positive rule set is TRUE, then the rule set is TRUE, and the LCR is kept.

For negative rule sets, if the rule set evaluates to FALSE, the LCR is kept. Thus, if all rules in the rule set are FALSE, then the rule set is FALSE, and the LCR is kept. If any rule in the rule set is TRUE, then the rule set result is TRUE, and the LCR is discarded.

Overview of Process of Adding a Node as a Master DBS

Figure 3:
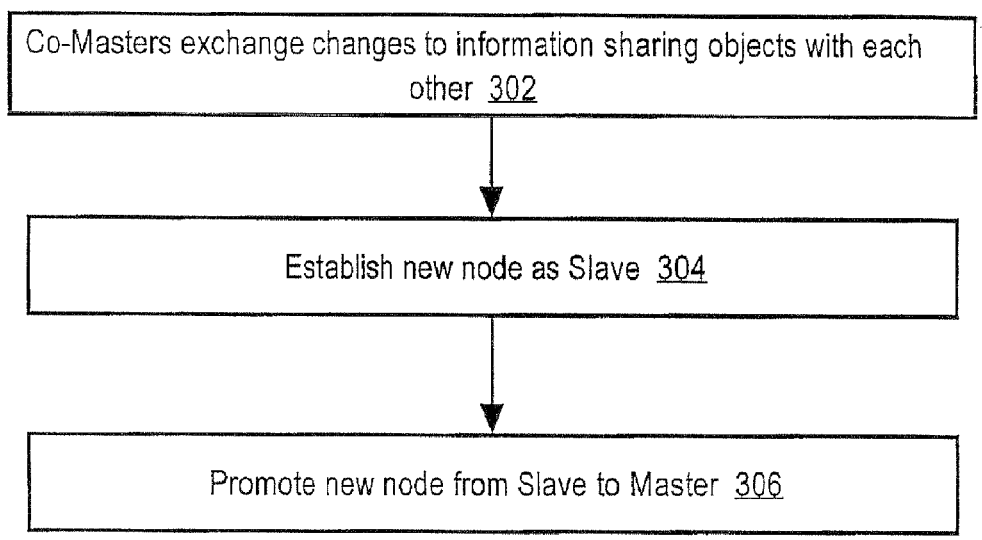
FIG. 3 is a flowchart illustrating a process of adding a new node as a master DBS, in accordance with an embodiment of the present invention.

FIG. 3 is a flowchart illustrating a process 300 of adding a new node as a master DBS 202, in accordance with an embodiment of the present invention. In general, process 300 includes initially adding a new DBS as a slave DBS 204 and then promoting the slave to a master DBS 204. Step 302 describes the initial configuration in which each of the co-master DBSs 202 exchange changes to objects with each other. For example, each co-master DBS 202 captures changes that occur to the information sharing objects stored at its database and propagates those changes to each other co-master DBS 202, which apply those changes.

Figure 2B:
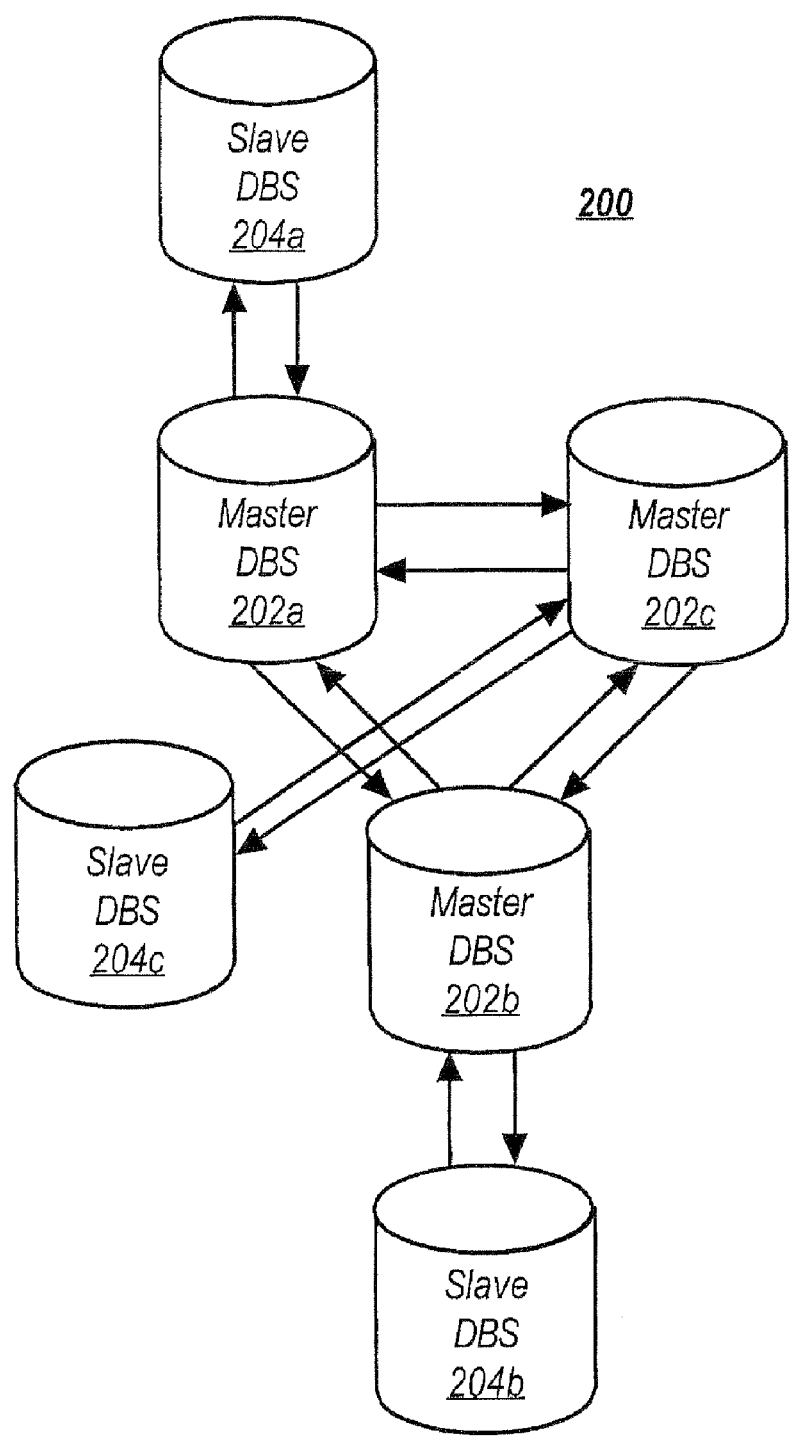
FIG. 2B shows a new node added to the example replication topology of FIG. 2A, in accordance with an embodiment of the present invention.

In step 304, a new node is established as slave DBS 204 to a particular master DBS 202. When the new node is acting as a slave DBS 204, the particular master DBS 202 forwards changes from all of the co-master DBS 202 to the new node. Moreover, the particular master DBS 202 captures changes that occur to the objects at the particular master DBS 202, and propagates the captured changes to the new node. FIG. 2B shows a new node 204*c* added to the example information sharing topology of FIG. 2A, in accordance with an embodiment of the present invention. In FIG. 2B, the new node 204*c* is a slave to master DBS 202*c*.

Figure 2C:
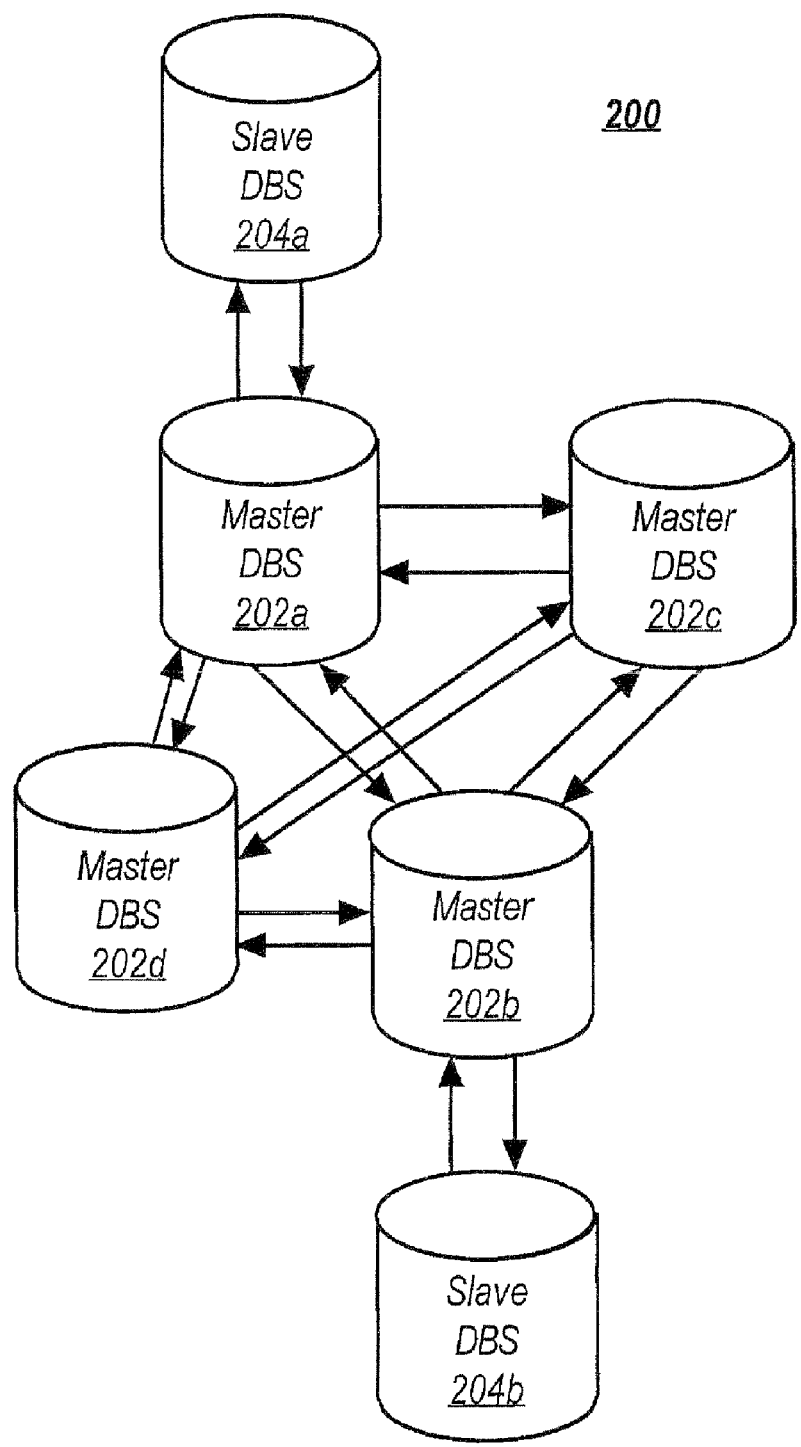
FIG. 2C shows the new node after it has been promoted to a master, in accordance with an embodiment of the present invention.

In step 306, the new node is promoted to a master DBS 202. When acting as a master DBS 202, the new node captures changes to objects stored at its database and propagates those changes on to each co-master DBS 202. Furthermore, each co-master DBS 202 propagates its changes to the new node. FIG. 2C shows the new node after it has been promoted to a master DBS 202*d*, in accordance with an embodiment of the present invention.

Example of Adding a Node as a Slave

Figure 4A:
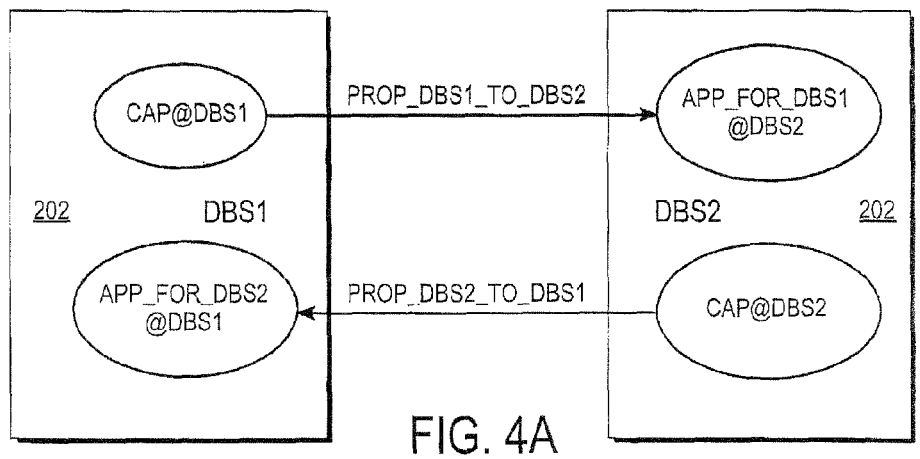
FIG. 4A shows a bi-directional replication environment having two nodes, each of which is a co-master, in accordance with an embodiment of the present invention.
Figure 4B:
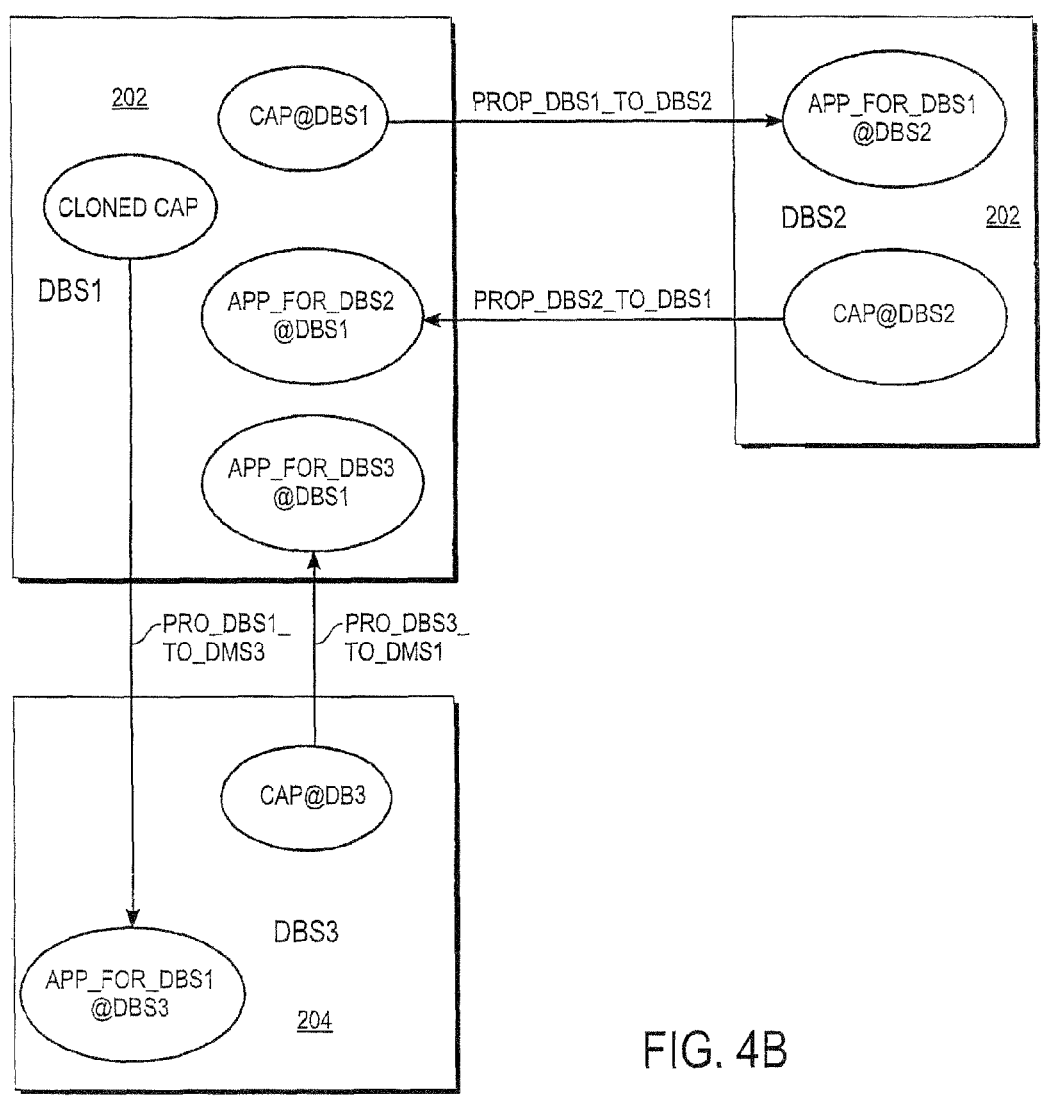
FIG. 4B shows a configuration in which a slave DBS is added to the configuration of FIG. 4A, in accordance with an embodiment of the present invention

FIGS. 4A and 4B illustrate further details of adding a new node as a slave, in accordance with an embodiment. FIG. 4A shows a bi-directional information sharing environment having two nodes, each of which is a co-master. For simplicity only two co-masters and no slaves are depicted; however, there could be many co-master DBS 202, as well as slave DBS 204. At DBS1, a capture process (CAP@DBS1) captures changes at DBS1 and a propagation (PROP_DBS1_TO_DBS2) sends the changes to DBS2. At DBS2, the apply process (APP_FOR_DBS1@DBS2) applies the changes that occurred at DBS1. At DBS2, a capture process (CAP@DBS2) captures changes to DBS2, which propagation process (PROP_DBS2_TO_DBS1) sends to DBS1. At DBS1, apply process (APP_FOR_DBS2@DBS1) applies those changes.

To prevent changes to DBS1 cycling back to DBS1, all changes originating from DBS1 and applied by APP_FOR_DBS1@DBS2 are tagged with the globally unique object identifier of APP_FOR_DBS1@DBS2. A rule is added to a negative rule set of PROP_DBS2_TO_DBS1 to filter out all changes tagged with the globally unique object identifier of APP_FOR_DBS1@DBS2. Tags and rules can be set up similarly to prevent changes originating at DBS2 cycling back to DBS2.

FIG. 4B shows a configuration in which DBS3 is added as a slave DBS 204 of master DBS1. The master to the slave will be referred to herein as the "particular master" to distinguish it from the other masters. The particular master (DBS1) forwards all the changes made at other co-master databases (DBS2) to a slave database (DBS3). In one embodiment, a slave DBS 204 is not allowed to make any changes to objects in the information sharing topology. In another embodiment, a slave DBS 204 is allowed to make changes. If a slave DBS 204 is allowed to make changes, the slave propagates those changes to only its particular master DBS 202, in an embodiment.

At DBS1, a new capture process (cloned CAP in FIG. 4B) is created to capture changes to be sent to DBS3. This new capture process is created by cloning CAP@DBS1, in one embodiment. However, it is not a requirement that this new capture process be cloned from another capture process. Prior to sending any changes, whatever information sharing objects are stored at DBS1 are exported from DBS1 and imported by DBS3. Because the data set associated with the information sharing objects may be large, the export/import may take a long time. However, because CAP@DBS1 is not used to send changes to DBS3, DBS3 does not negatively impact CAP@DBS1. That is, even if DBS3 is slow at applying changes, the other DBS can continue to apply changes from CAP@DBS1.

Furthermore, a capture process (CAP@DBS3) is created at DBS3 to capture changes from DBS3 and send them to the particular master DBS1. An apply process (APP_FOR_DBS3@DBS1) is created at DBS1 to apply changes from DBS3. A propagation (PROP_DBS3_TO_DBS1) is created to propagate changes from DBS3 to DBS1. Negative rules may be added to PROP_DBS3_TO_DBS1 and PROP_DBS1_to_DBS3 to prevent changes from cycling.

Figure 5:
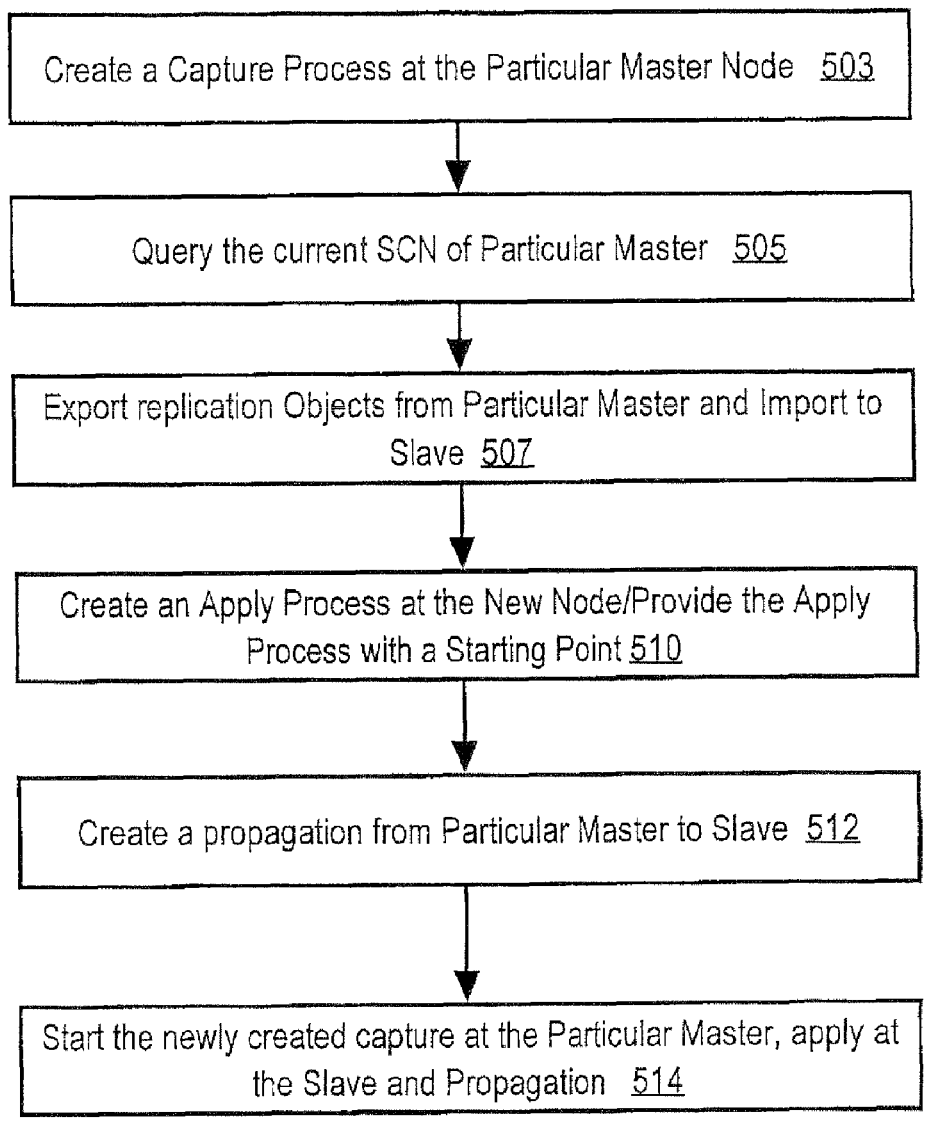
FIG. 5 is a flowchart illustrating a process of adding a new node as a slave, in accordance with an embodiment of the present invention.

FIG. 5 is a flowchart illustrating a process 500 of adding a new node as a slave to a particular master node, in accordance with an embodiment of the present invention. FIGS. 4A and 4B will be used to help describe process 500. In step 503, a capture process is created at the particular master node. For example, CLONED_CAP is created to allow DBS1 to capture changes to information sharing objects at DBS1. In one embodiment, creating the capture process includes creating a capture queue. In one embodiment, creating the capture process includes adding positive rules from the existing capture (CAP@DBS1) to a rule set for the new capture process.

In step 505, the current SCN of the particular master DBS is queried. In step 507, export of the information sharing objects from the particular master and import of the objects to the new node is initiated. The export is performed at the current SCN of the particular master DBS, which was queried in step 505.

In step 510, an apply process, which is for changes from the particular master DBS, is created at the new node. For example, APP_FOR_DBS1@DBS3 is created to allow DBS3 to apply changes from DBS1. Further, the apply process is informed as to which changes it should apply from its particular master. For example, the SCN of DBS1 that was queried in step 504 is provided to the new node's apply process. Thus, the apply process will know which changes to apply. In one embodiment, creating the apply process includes creating an apply queue. In one embodiment, creating the apply process includes adding apply rules to a rule set.

In step 512, a propagation process to send changes from the particular master DBS to the slave DBS is created. For example, PROP_DBS1_TO_DBS3 is created. In step 514, the newly created capture process at the particular master DBS, the apply process at the slave DBS and the propagation processes are started.

As previously discussed, the new node may or may not be allowed to make and propagate changes to information sharing objects. If the new node is allowed to make changes, a new capture process (e.g., CAP@DB3) is created at the new DBS to capture changes at the new node. Furthermore, a new apply process (e.g., APP_FOR_DBS3@DBS1) (along with apply rules) is created at the particular master DBS to apply changes from the new node. A new apply queue is also created at the particular master DBS, in an embodiment. Furthermore, a new propagation process (PROP_DBS3_TO_DBS1) is created to forward the changes from the slave's capture process to the particular master's apply process. Furthermore, negative rules may be added to PROP_DBS3_TO_DBS1 and PROP_DBS1_to_DBS3 to prevent changes from cycling.

Example Process of Promoting a Slave to a Master

Figure 6:
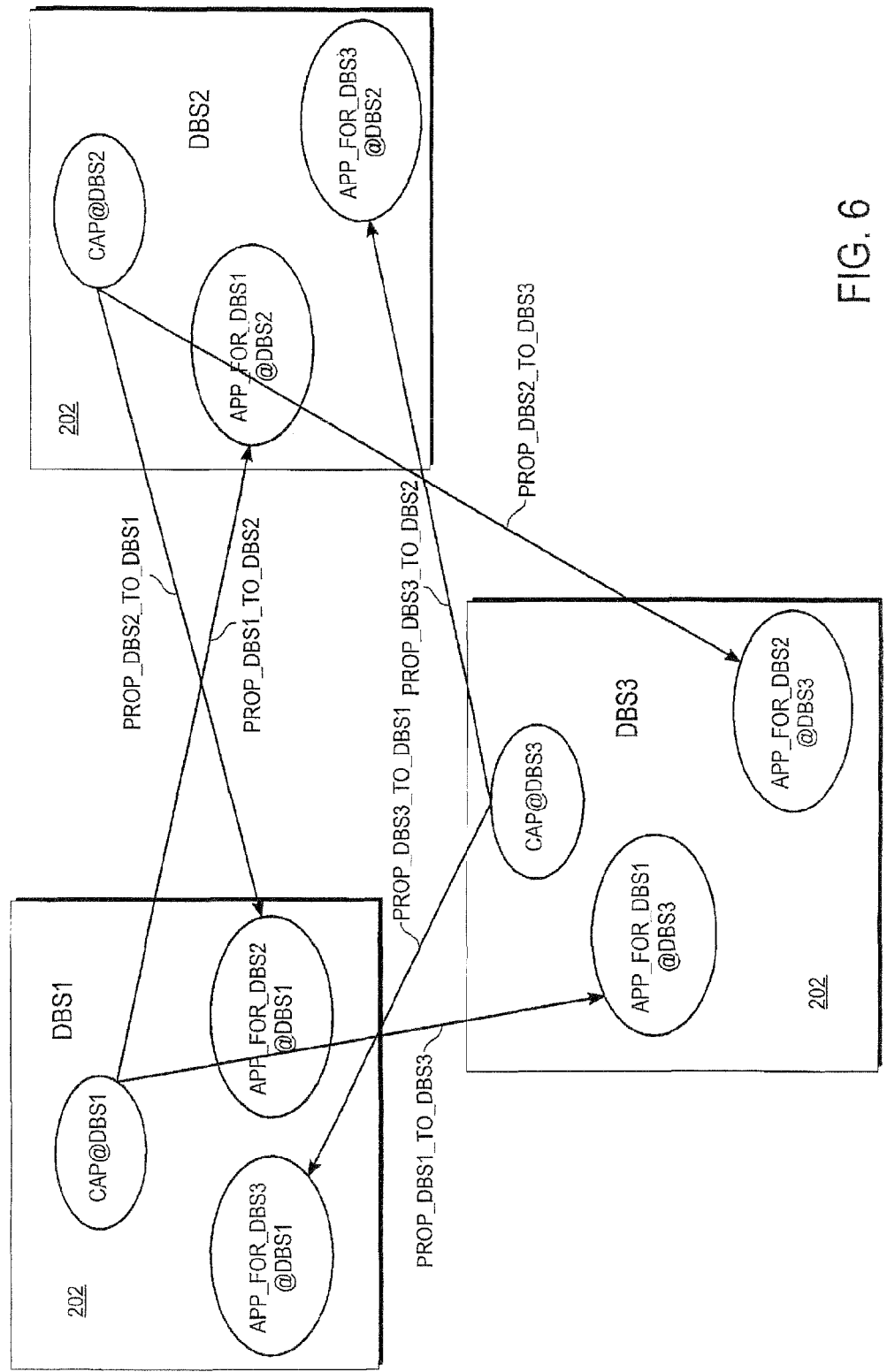
FIG. 6 shows the configuration of FIG. 4B after promoting the slave DBS to a master, in accordance with an embodiment.
Figure 7:
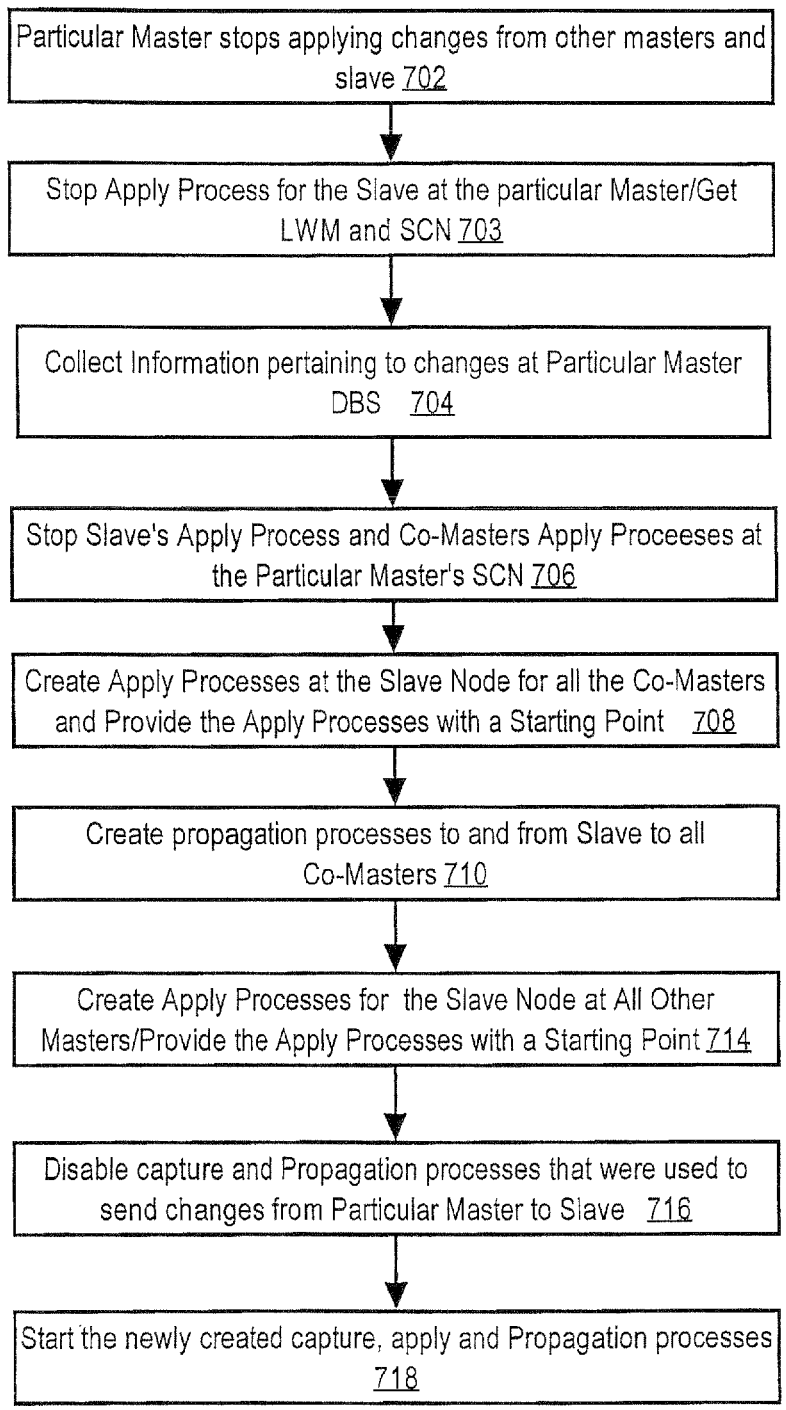
FIG. 7 is a flowchart of a process for promoting a slave to a master, in accordance with an embodiment.

A slave DBS 204 is promoted to a master DBS 202 in accordance with an embodiment. In one embodiment, an API is provided to allow a user to select a node to promote to master. FIG. 6 shows the configuration after promoting a slave to a master, in accordance with an embodiment. FIG. 7 is a flowchart of a process 700 for promoting a slave to a master, in accordance with an embodiment. In step 702, the particular master stops applying changes from co-masters and from the slave. For example, APP_FOR_DBS2@DBS1 is stopped.

In step 703, the apply process for the slave at the particular master DBS is stopped. For example, APP_FOR_DBS3@DBS1 is stopped. Furthermore, the SCN at the particular master and the LWM of the apply process for the slave are queried.

In step 704, information is collected that is pertinent to changes at the particular master DBS. For example, the current SCN of the particular master DBS is queried. The current SCN of the particular master DBS may be used as a stopping point for apply processes at the slave. Furthermore, the low watermark and oldest SCN of APP_FOR_DBS2@DBS1 are queried.

If there are other apply processes at the particular master DBS, the low watermark and oldest SCN is queried for each apply process. For example, the low watermark and oldest SCN is queried for apply processes corresponding to every other co-master. The oldest SCN for an apply process is provided to the co-master that captured the changes being applied at the particular master, in an embodiment. The oldest SCN informs the co-master which changes should be captured when the capture process is restarted, in an embodiment. The low watermark is provided to the slave node, in an embodiment. The slave node uses the low watermark to determine which changes from the other co-masters should be applied once the slave node has been promoted to a master.

The slave DBS apply process (APP_FOR_DBS1@DBS3) is allowed to run until the previously mentioned current SCN of the particular master DBS, at which point the slave's apply process is stopped, in step 706. Furthermore, apply processes at co-masters are allowed to run until they reach the current SCN of the particular master DBS, in an embodiment. The LWM of an apply process at the point at which it is stopped is used as an instantiation SCN, in an embodiment. There should not be any applied transaction above the LWM. In other words, there should not be any above-mark applied transactions. If there are above-mark applied transactions, then the process 700 should be repeated.

In step 708, apply processes are created at the slave node for each of the co-masters. For example, an apply process (APP_FOR_DBS2@DBS3) is created at DBS3 to apply changes from DBS2. Apply processes are also created for DBS3 by other co-master DBS 202. In one embodiment, an apply queue is created for each apply process. The apply tag for each new apply process is set to be the object identifier (OID) of the apply process, in an embodiment.

The new apply processes at the slave are also informed as to which changes from the co-masters are to be applied. For example, to apply changes from DBS2, an instantiation SCN of DBS2 is set to be the low watermark of APP_FOR_DBS2@DBS1, in an embodiment. The instantiation SCN of DBS2 provides the apply processes at DBS3 with a logical point, such that changes that occurred at DBS2 after the logical point should be applied at DBS3. For the apply processes for the co-masters at the slave node, the instantiation SCN is set to the low watermark for other apply processes at the particular master, which were collected in step 704. Then, the new apply processes at the slave node are started. For example, APP_FOR_DBS2@DBS3 is started.

In step 710, propagations are created to and from the slave node. For example, a new propagation (PROP_DBS1_TO_DBS3) is created from DBS1 to DBS3 to propagate changes captured by CAP@DBS1. In one embodiment, rules are added to a negative rule set of the propagation to prevent change cycling. The rules could be in the format of "tag=OID of apply process", for every apply process at the database from which the propagation originates. The databases from which the propagation originates could include any of the masters as well as the new master. For the propagations from each of the co-master nodes to the slave node, a set of positive rules are added, in an embodiment. The positive rules are copied from the positive rule set from the propagation from a given co-master to the particular master, in one embodiment.

In step 714, apply processes are created at all of the co-masters for applying changes from the slave node. For example, a apply processes (APP_FOR_DBS3@DBS1 and APP_FOR_DBS3@DBS2) are created to apply changes from DBS3. These new apply processes at the co-masters are also informed as to which changes from the slave node are to be applied. The information that is provided depends on whether or not the slave node (e.g., DB3) is allowed to make changes. For example, the slave node may or may not be allowed to make user or local changes.

If the slave node is not allowed to make changes, then an instantiation SCN of DBS3 is established as the current SCN of DBS3. The new apply processes at the co-masters use the instantiation SCN of DBS3 to determine which changes from DBS3 are to be applied.

However, if the slave node is allowed to make local changes, then the LWM from step 703 is used as the instantiation SCN of the slave node. Again, the new apply processes at the co-masters use this instantiation SCN of DBS3 to determine which changes from the slave node are to be applied. Moreover, the oldest_scn that was queried in step 703 is used to restart the capture process at the slave node.

In step 716, the capture and propagation processes that were used to send changes from the particular master to the slave are disabled. For example, referring to FIG. 4B, the cloned CAP and the propagation from the cloned CAP to the slave node are disabled. However, APP_FOR_DBS1@DBS3 does not need to be disabled. Rather, that apply process can continue to be used, based on changes from CAP@DBS1.

In step 718, the newly created capture, apply, and propagation processes are enabled.

In one embodiment, a slave node is added to as a master database directly, without making it a slave and then promoting it to a master. The steps to do this is very similar to the processes 500 and 700 described in FIG. 5 and FIG. 7, except that there is no need to create a new capture process at the source database.

Example Pseudocode of Promoting a Slave to a Master

The following describes pseudocode of promoting a slave node to a master node, in accordance with one embodiment. In the example pseudocode, the node that is being promoted from slave to master is referred to as the destination node. The "source node" is the master node to the destination node when the destination acts as a slave. In the example pseudocode, temp_propagation, temp_capture, temp_apply, source_temp_queue, and dest_temp_queue refer to the propagation, capture, apply, and queues that are established when first adding the destination node as a slave. For example, referring to FIG. 4B, APP_FOR_DBS1@DBS3 can serve as temp_apply and CLONED_CAP can serve as temp_capture.

Perform the following at the source node:
a. Stop All apply processes for master nodes other than the source node (OtherMasters).
B. Query the low watermark and oldest_scn of all apply process.
c. Query the current SCN of the source (current_scn2). The current SCN is provided to the apply process at the destination that applies changes from the Source with the understanding that the apply processes are to stop at the current SCN.

Perform the following actions for each of the OtherMasters:
d. Get the oldest SCN and low watermark of each apply process at the source node.
e. Create an apply queue at the destination node to receive changes from each OtherMaster. Create an apply process at the destination node for each OtherMaster and add positive rules to the apply process.
f. Create an apply queue at each OtherMaster node to receive changes from destination. Create a apply process at each OtherMaster for the destination and add positive rules to the apply process.
g. At destination node, set the instantiation SCN of the OtherMaster as low watermark.
h. Create a propagation to Destination. Add rules from the positive rule set of the propagation from this OtherMaster to Source to its positive rule set. Disable it.
i. Get apply_obj# for applies that apply changes from Source/OtherMasters/Destination, and add rule tag=apply_obj1∥apply_obj2∥ . . . to its negative rule set.
j. Restart capture at OtherMasters from oldestSCN.
k. Start the apply process that applies its change at Destination.

Perform the following at the Destination node:
l. If no queue exists for the apply process that applies changes from Source, create an apply queue.
m. If no queue exists for the capture process, create a capture queue.
n. Create an apply process for the source node and add rules for the apply process.
o. Create propagation to all other databases and add propagation rules. Get apply_obj# (apply_obj1, aply_obj2 . . . ) for apply processes that apply changes from Source/OtherMasters, including temp_apply, and add rule tag=tag=apply_obj1∥apply_obj2∥ . . . to its negative rule set.
a. Create a capture process and add positive rules for capture process.
b. Get current SCN of Source, and let temp_apply stop at this SCN. Wait until apply_temp stops.
c. Get low watermark and oldest SCN of temp_apply.
d. Start the apply process at low watermark of temp_apply.
p. Start capture process.

Perform the following at the source node
q. Create a propagation from Source to Destination. Add rules from positive rule set of temp_propagation to positive rule set of this new propagation.
r. Get apply_obj# for applies that apply changes from OtherMasters/Destination. Add negative rules, and disable this new propagation.
s. Restart capture at oldest scn of temp_apply.

Drop temp_propagation, temp_capture, temp_apply, source_temp_queue, and dest_temp_queue.
Enable all disabled processes.

Example of Downgrading a Master to a Slave

In an embodiment, a master is downgraded to a slave. Referring to FIG. 6, the following describes an example in which DBS3 is downgraded from a master to a slave of DBS1. The current SCN of DBS2 is obtained. Apply processes (APP_FOR_DBS2@DBS3 and APP_FOR_DBS2@DBS1) that apply changes from DBS2 stop at this SCN. When they stop, these two apply processes should have no unapplied transactions with a commit SCN greater than the low watermark. If they do have any such transactions, then the current SCN of DBS2 is again obtained, and the apply processes run until this current SCN. This step ensures that DBS1 and DBS3 have applied the same set of transactions from DBS2, and it is safe to let DBS1 forward changes from DBS2 to DBS3 from this point.

The current SCN of DBS3 is obtained, and the apply process (APP_FOR_DBS3@DBS1 and APP_FOR_DBS3@DBS2) that apply changes from DBS3 stop at this SCN. When they stop, the two apply process should have no unapplied transactions with a commit SCN greater than the low watermark. If they do have any such transactions, then the current SCN of DBS3 is again obtained, and the apply processes run until this current SCN. This step ensures that DBS1 and DBS2 have applied the same set of transactions from DBS3, and it is safe to let DBS1 forward changes from DBS3 to DBS2 from this point.

The propagation from DBS2 to DBS3 (PROP_DBS2_TO_DBS3) is dropped. Furthermore, the apply process at DBS3 for the changes from DBS2 (APP_FOR_DBS2@DBS3) is dropped. Similarly, the propagation from DBS3 to DBS2 (PROP_DBS3_TO_DBS2) and the apply process at DBS2 for changes from DBS3 (APP_FOR_DBS3@DBS2) are dropped.

When all apply processes at DBS1 stop, the current SCN of DBS1 is queried. Apply processes (APP_FOR_DBS1@DBS3 and APP_FOR_DBS1@DBS2) that apply changes from DBS1 are to stop at this SCN. This step ensures that changes from DBS2 until this point are filtered by propagation from DBS1 to DBS3, and changes from DBS3 until this point are filtered by propagation from DBS1 to DBS2.

Then wait until APP_FOR_DBS1@DBS3 stops. The negative rules of PROP_DBS1_TO_DBS3 are changed, so that changes tagged with the object identifier of APP_FOR_DBS2@DBS1 will not be filtered by the propagation. PROP_DBS1_TO_DBS3 will forward changes from DBS2 to DBS3.

Then wait until APP_FOR_DBS1@DBS2 stops. The negative rule of PROP_DBS1_TO_DBS2 are changed, so that changes tagged with the object identifier of APP_FOR_DBS3@DBS1 will not be filtered by the propagation. PROP_DBS1_TO_DBS2 will forward changes from DBS3 to DBS2.

CAP@DBS2 is re-started from the oldest_scn of APP_FOR_DBS2@DBS1. CAP@DBS3 is re-started from the oldest_scn of APP_FOR_DBS3@DBS1. CAP@DBS1 is re-started from the oldest_scn of APP_FOR_DBS1@DBS3. All apply processes are then re-started.

General Process for Downgrading a Master to a Slave

The following section provides a general description for downgrading a master to a slave. In the general description, the slave is referred as Destination, and the master of the slave is referred to as Source. All other nodes in the n-way configuration are referred as OtherMaster.

For each of OtherMaster, get the current SCN, and let all apply process that apply changes from it stop at this SCN. Ensure for every apply process that there is no unapplied transactions with a commit SCN greater than the low watermark of the apply process.

For Destination, get the current SCN, and let all apply processes that apply changes from it stop at this SCN. Ensure for every apply process that there is no unapplied transactions with a commit SCN greater than the low watermark of the apply process.

At Destination, Drop all apply processes that apply changes from OtherMaster. Drop all propagation that sends changes to OtherMasters or get changes from Other Masters. For every OtherMaster, Drop the apply process that applies changes from Destination.

At Source, wait till all apply processes at Source stop. Get the current SCN of Source, and let all apply processes that apply changes from Source stop at this SCN. Ensure for every apply process that there is no unapplied transaction with a commit SCN greater than the low watermark of the apply process.

At Destination, wait till the apply process that apply changes from Source stops. Change the negative rule of the propagation that sends changes from Source to Destination, so that changes propagated from OtherMaster to Source will be forwarded to Destination.

For each OtherMaster:
Wait until the apply process that apply changes from Source to this OtherMaster stops.
Change the negative rule of the propagation from Source to this OtherMaster, so that changes from Destination will forwarded to this OtherMaster.

Re-start all apply processes. For every OtherMaster, re-start the capture process at from the oldest_scn of the apply process at Source that applies changes from it. For Source, re-start the capture from the oldest_scn of the apply process at Destination that applies changes from Source.

Splitting and Merging Propagation Streams
Overview

Figure 13:
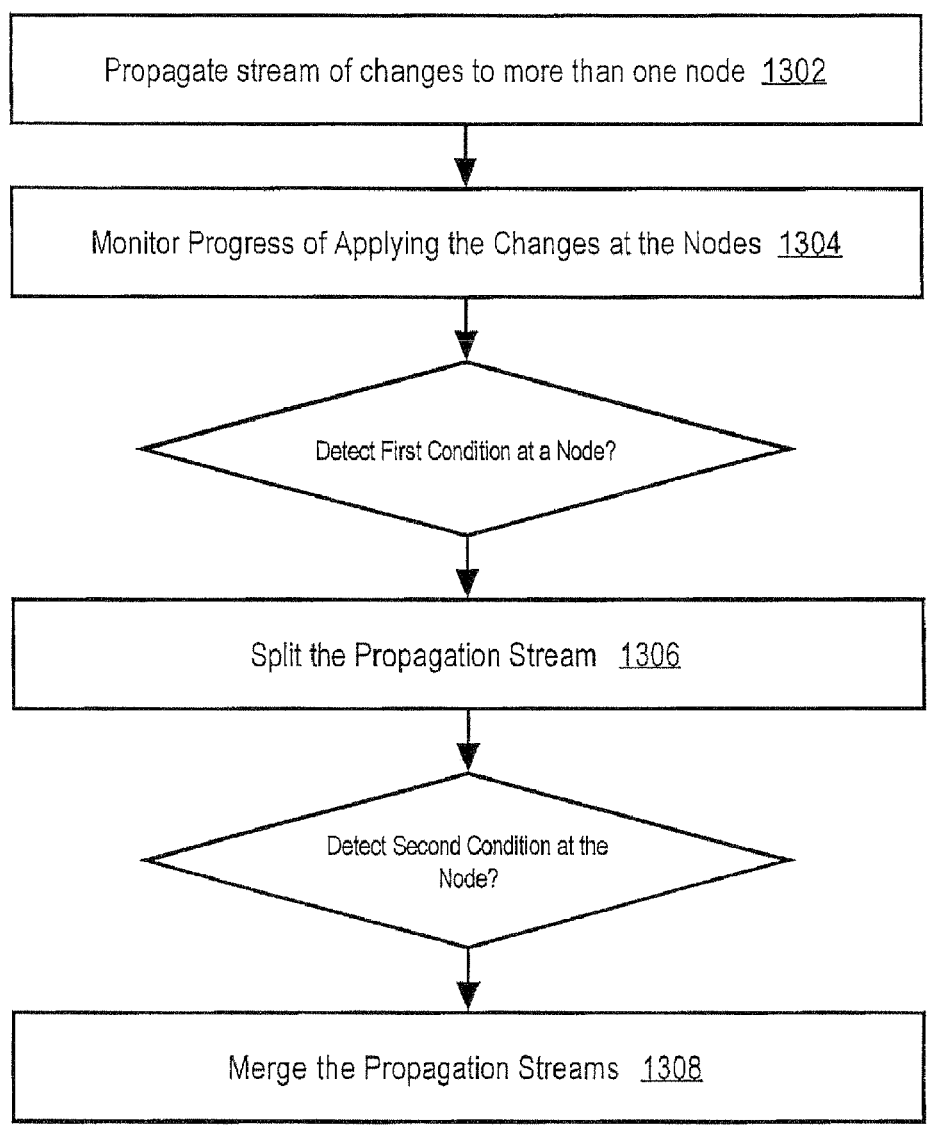
FIG. 13 shows an overview of a process for splitting and merging propagation streams, in accordance with an embodiment of the present invention.

FIG. 13 shows an overview of a process 1300 for splitting and merging propagation streams, in accordance with an embodiment of the present invention. In step 1302, a single propagation stream of changes from a source node is sent to multiple destination nodes.

In step 1304, the progress of applying the changes at the destination nodes is monitored. In one embodiment, a monitoring process is established at each of the destination nodes to monitor the progress. In one embodiment, a monitoring process is established at a source database to monitor all propagations from the source. Whatever monitoring processes were established may forward information they collect to a process that compares information collected, such as the progress at each of the destination nodes.

In response to detecting a first condition at one of the destination nodes, the propagation stream is split in step 1306. For example, a new propagation stream is established to send changes to the destination node at which the condition was detected. As an example, the condition could be that the destination node had fallen behind the other destination nodes in applying the changes by a specified amount. The amount is specified by a user through an API, in one embodiment.

In response to detecting a second condition at the destination node, the streams are merged in step 1308. For example, if problems are fixed at the destination node and it catches up, or nearly catches up, with the other nodes, then the propagation streams are merged.

Example of Splitting and Merging a Propagation Stream

Figure 8A:
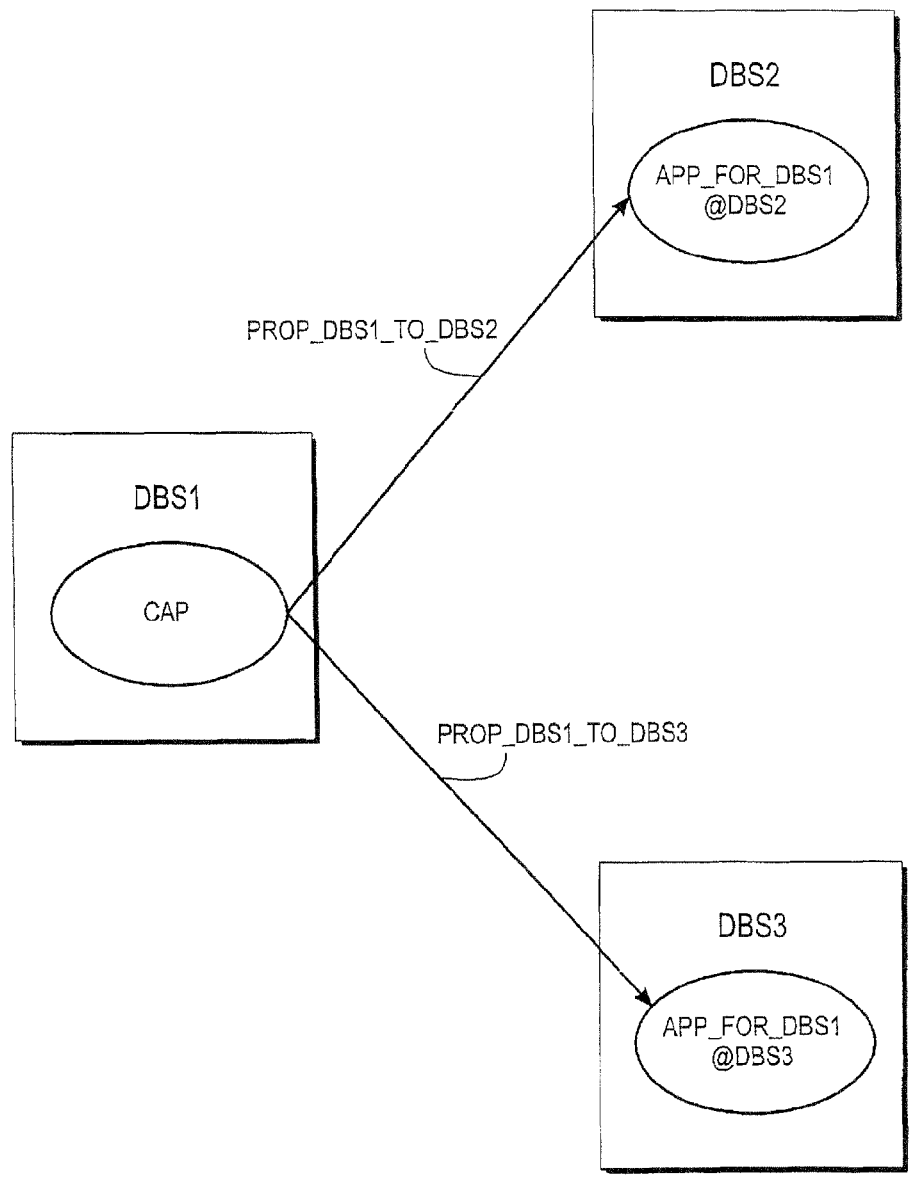
FIG. 8A shows a configuration having a single propagation stream, in accordance with an embodiment.

FIG. 8A shows a configuration having a single propagation stream, in accordance with an embodiment. A capture process (CAP) captures changes from DBS1, which are propagated to DBS2 and DBS3. Apply processes, APP_FOR_DBS1@DBS2 and APP_FOR_DBS1@DBS3, are set up at DBS2 and DBS3 to apply changes from DBS1. For simplicity, a source queue and destination queues are not depicted in FIG. 8. Even though there are two propagation processes in FIG. 8A, it is considered a single stream because the changes originate from the same capture process. If the progress of one destination database lags substantially behind the other destination database, the propagation stream can be split such that the problematic destination does not negatively impact the other destination. A reason that an offending destination could impact the other destination is that the queue either needs to hold unconsumed messages for the offending destination or spill the unconsumed messages.

Figure 8B:
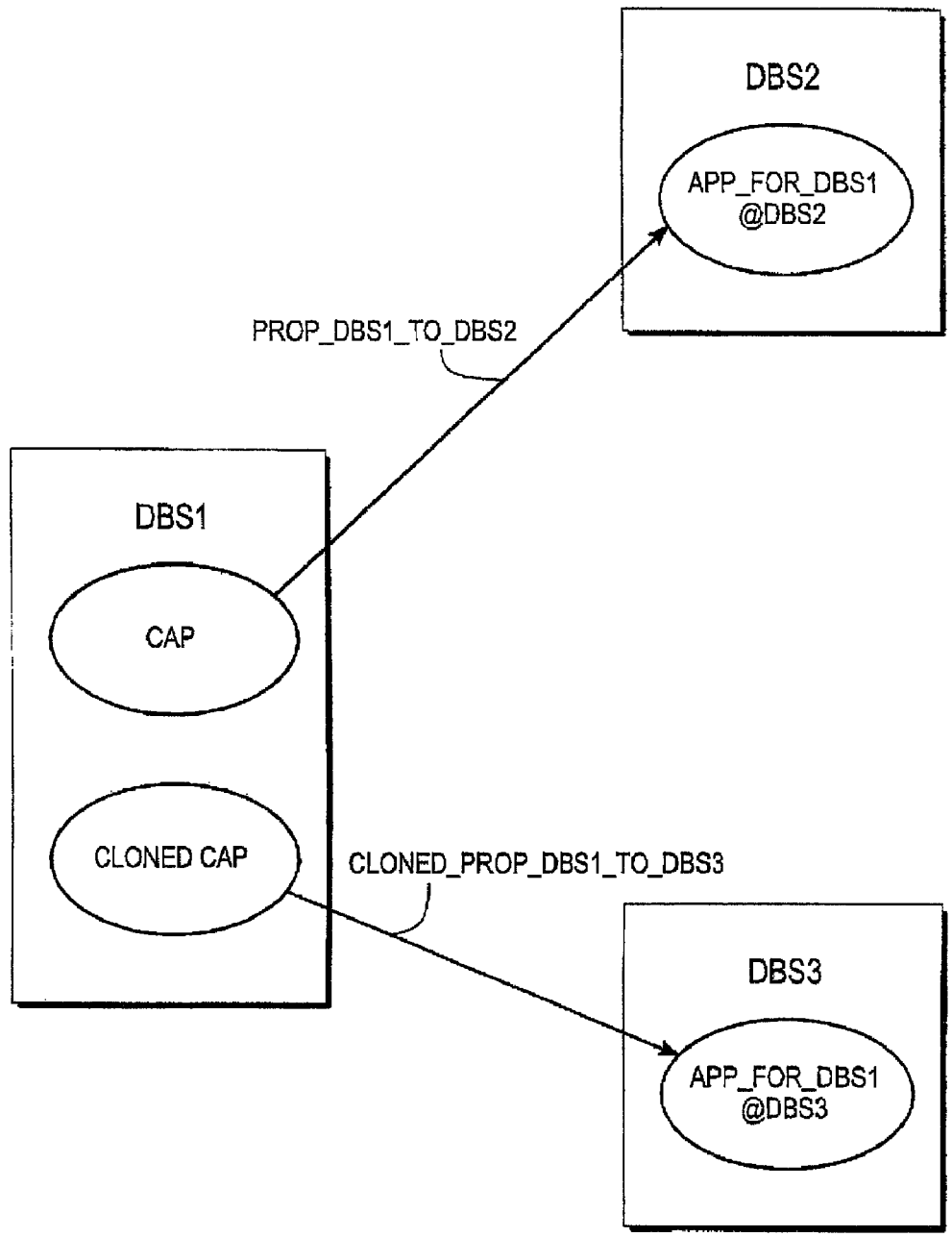
FIG. 8B shows the original propagation of FIG. 8A split into two propagations, in accordance with an embodiment.

FIG. 8B, the original propagation shown in FIG. 8A is split into two propagations, in accordance with an embodiment. For example, a new capture process (CLONED_CAP) has been added to capture changes that are sent to DBS3 using new propagation process CLONED_PROP_DBS1_TO_DBS3. In one embodiment, a split-merge API computes a start_scn for the cloned capture process. In one embodiment, the start_scn of the cloned capture process (CLONED_CAP) is established as the SCN of the original capture process (CAP) at the point at which the CLONE was created. In another embodiment, the start_scn of the cloned capture process (CLONED_CAP) is established as the oldest SCN of APPLY_FOR_DBS1@DBS3.

Rule sets may be handled as follows. The cloned propagation may be provided with the rule set of its original propagation. If the original propagation does not have a rule set, the cloned propagation may be provided with the rule set of the original capture. The cloned capture may be provided with the rule set of the cloned propagation.

When problems with DBS3 are fixed, CLONED_CAP can be started. Eventually, the split streams can be merged. For example, eventually, the progress of CLONED_CAP may catch up with CAP, or at least nearly catch up. In one embodiment, a Merge_streams API can be called to merge back the cloned propagation (CLONED_PROP_DBS1_TO_DBS3) and restart the original capture process (CAP) from a new start_scn.

Figure 9:
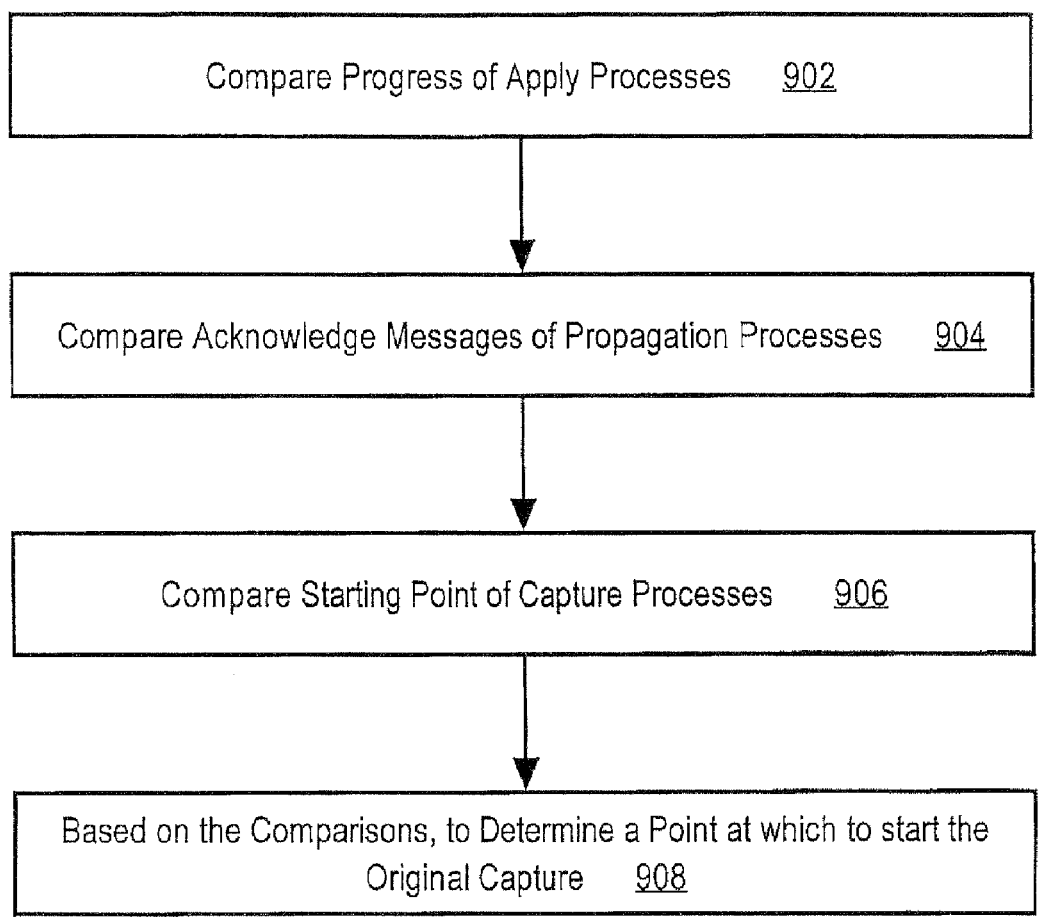
FIG. 9 illustrates a process for determining which changes to objects at the source node should be captured after merging streams, in accordance with an embodiment of the present invention.

Determining which Changes Made at the Source Node should be Captured after Merging Streams FIG. 9 illustrates a process 900 for determining which changes to objects at the source node should be captured after merging streams, in accordance with an embodiment of the present invention. For example, changes that are made to objects at the source node at or after a particular SCN are captured, in an embodiment. Process 900 can be used to determine the particular SCN. In step 902, the progress of the apply processes at the destination nodes are compared. In one embodiment, an oldest_message_number of APP_FOR_DBS1@DBS2 and APP_FOR_DBS1@DBS3 are compared with each other. The oldest_message_number is the earliest message number of the transactions currently being dequeued and applied by a apply process. In one embodiment, the comparison determines the earliest of the oldest messages.

In step 904, the acknowledge messages of the split propagation processes are compared. In one embodiment, the acknowledge messages are the last message acknowledged by a propagation process. In one embodiment, the comparison determines the earliest of the acknowledge messages.

In step 906, the starting points of the capture processes of each branch of the split propagation are compared. In one embodiment, the start_scn of CAP and CLONED_CAP are compared with each other. A Start_scn is the message number from which the capture process will start to capture changes. In one embodiment, the comparison looks for earliest SCN.

In step 908, based on the comparisons in the previous steps, a starting point for the capture process of the merged propagation is determined. The starting point is identified by an SCN, in an embodiment. In one embodiment, the messages are associated with SCNs such that a message can be compared to an SCN. For example, the higher the message number or SCN, the newer it is. In one embodiment, the comparison of step 908 determines the newest (or maximum) of the results of the comparisons of the previous steps. For example, step 908 determines the maximum of: 1) the minimum oldest_message_number from step 902; 2) the minimum acked_scn from step 904; and 3) the minimum start_scn from step 906. This determined value is used as the start_SCN of the capture process after the merge. Thus, any changes made at or after the start_SCN will be captured and propagated in the merged stream.

Adding a New Object to the Information Sharing Environment

Figure 10:
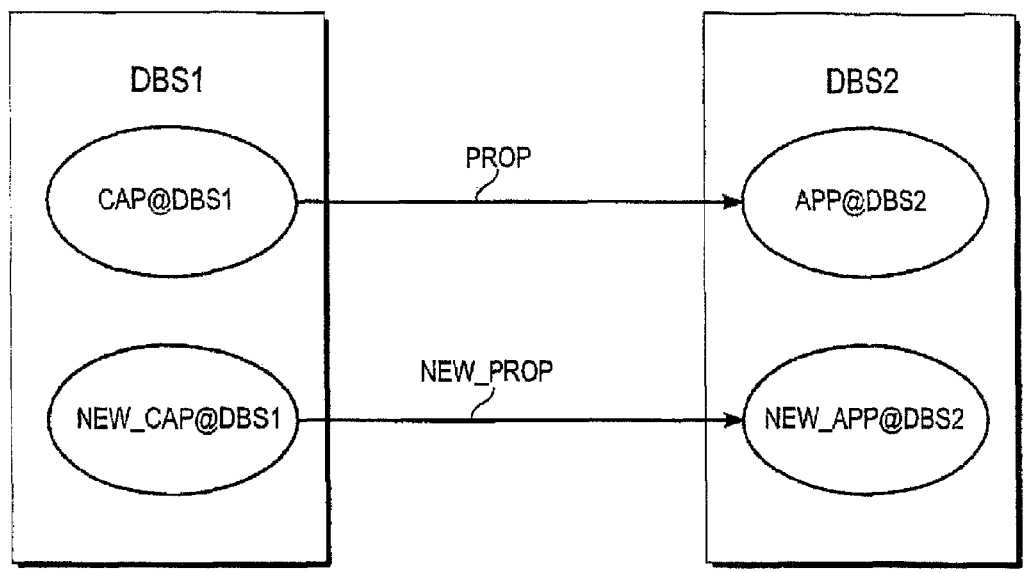
FIG. 10 shows two data streams in a one-directional replication environment, in accordance with an embodiment of the present invention.

In one embodiment, an API can be used to add a new database object to the existing information sharing environment in accordance with an embodiment of the present invention. FIG. 10 shows two data streams in a one-directional information sharing environment, in accordance with an embodiment of the present invention. The first data stream includes a capture process (CAP@DBS1) that captures changes from DBS1, and an apply process (APP@DBS2) that applies changes propagated from DBS1 by a propagation (PROP). To add a new object to the information sharing environment, a second stream that is dedicated to the new object is created. In FIG. 10, the second stream includes NEW_CAP@DBS1, NEW_PROP, and NEW_APP@DBS2. At some point, the second stream is merged with the first stream in order to add the new object to the information sharing environment.

Figure 11:
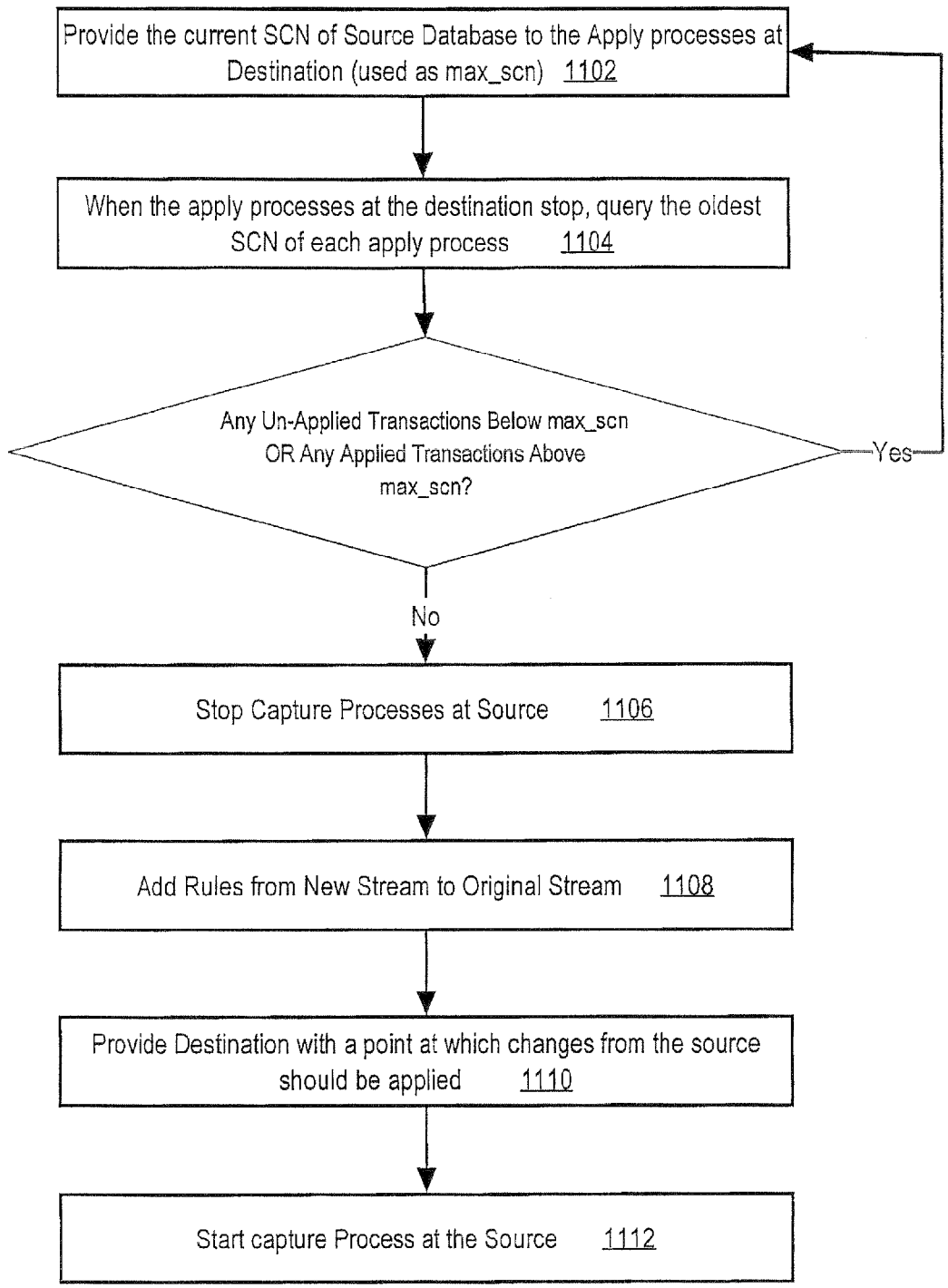
FIG. 11 describes a process for adding a new object to a replication environment by merging the new stream with an original stream, in accordance with an embodiment of the present invention.

FIG. 11 describes a process 1100 for adding a new object to an information sharing environment by merging the new stream with an original stream, in accordance with an embodiment of the present invention. In step 1102, the current SCN of the source database (e.g., DBS1) is queried. The current SCN is provided as the max_scn of apply processes at DBS2 (APP@DBS2 and NEW_APP@DBS2). The apply process will be stopped when they reach this point.

In step 1104, when the apply processes at the destination stop, the oldest SCN of each is queried. There should be no un-applied transactions below the max_scn, and there should be no applied transactions above the max_scn. Otherwise, steps 1102 and 1104 are repeated.

In step 1106, the capture processes at the source (CAP@DBS1 and NEW_CAP@DBS1) are stopped. In step 1108, rules from new stream are added to the original stream. For example, all capture rules of NEW_CAP@DBS1 are added to CAP@DBS1, all propagation rules of NEW_PROP are added to PROP, and all apply rules of NEW_APP@DBS2 are added to APP@DBS2. Furthermore, NEW_CAP@DBS1, NEW_PROP, and NEW_APP@DBS2 are dropped.

In step 1110, the destination is provided with a starting point at which to apply changes from the source. All changes that were made at the source node after the starting point are to be applied at the destination node. In one embodiment, the starting point is identified by an SCN such that the destination node can identify changes that should be applied. In an embodiment, the starting point is the max_scn from step 1102. Thus, the destination node (DBS2) has a point at which changes should be applied.

In step 1112, the capture process at the source is started. To determine at which point the capture process should be started, the oldest SCN of APP@DBS2 and NEW_APP@DBS2 from step 1104 are compared. The capture process is started at the minimum (e.g., oldest) of the oldest SCN.

Hardware Overview

Figure 12:
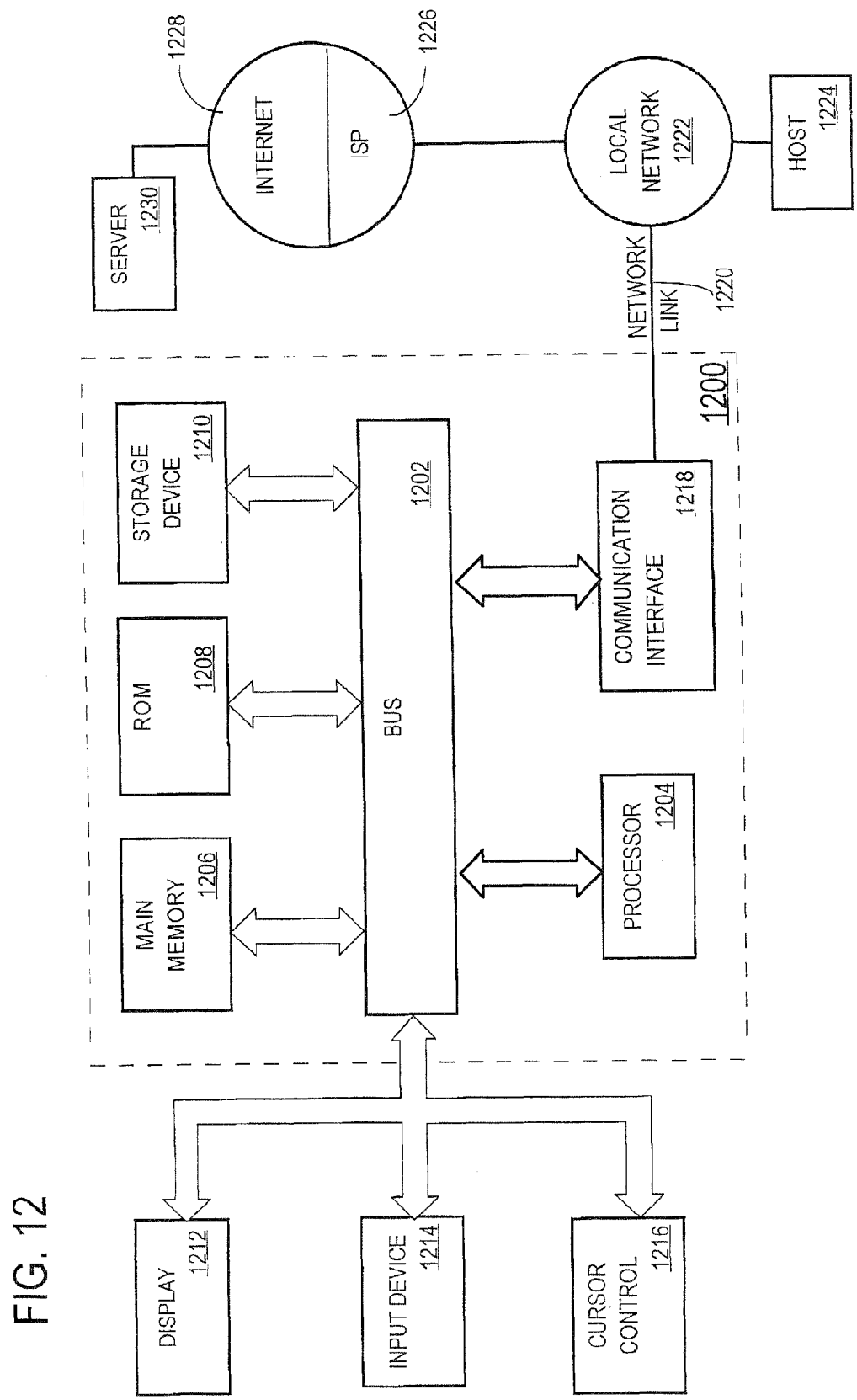
FIG. 12 is a block diagram of a computer system on which embodiments of the invention may be implemented.

FIG. 12 is a block diagram that illustrates a computer system 1200 upon which an embodiment of the invention may be implemented. Computer system 1200 includes a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The invention is related to the use of computer system 1200 for implementing the techniques described herein. According to one embodiment of the invention, those techniques are performed by computer system 1200 in response to processor 1204 executing one or more sequences of one or more instructions contained in main memory 1206. Such instructions may be read into main memory 1206 from another computer-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1204 for execution. Such a medium may take many forms, including but not limited to, non-volatile media, volatile media, and transmission media. Non-volatile media includes, for example, optical or magnetic disks, such as storage device 1210. Volatile media includes dynamic memory, such as main memory 1206. Transmission media includes coaxial cables, copper wire and fiber optics, including the wires that comprise bus 1202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data information sharing system 100 representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data information sharing system 100. The signals through the various networks and the signals on network link 1220 and through communication interface 1218, which carry the digital data to and from computer system 1200, are exemplary forms of carrier waves transporting the information.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution. In this manner, computer system 1200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:

propagating, to a plurality of destination nodes in an information sharing topology, a first stream that describes changes to content in one or more database objects at a source node in the information sharing topology;

wherein said one or more database objects at said source node correspond to one or more database objects in a database at a destination node;

establishing a monitoring process to monitor progress of application of the changes to the plurality of destination nodes, wherein application of the changes comprises, for each destination node of said plurality of destination nodes, applying changes to the one or more corresponding database objects in a database at said each destination node;

in response to the monitoring process detecting a condition with respect to application of the changes at a first destination node of the plurality of destination nodes, determining a logical point that identifies which changes made to database objects at the source node should be captured for a second stream and performing the following:

continuing to propagate the first stream to at least one node of the plurality other than the first destination node; and propagating, to the first destination node, the second stream that describes changes to the database objects at the source node wherein the method is performed by one or more computing devices.

2. The method of claim 1, further comprising monitoring application, at the first destination node, of the changes described by the second stream.

3. The method of claim 2, wherein the condition is a first condition and further comprising:
   in response to detecting a second condition with respect to application, at the first node, of the changes described by the second stream, performing the following:
      halting propagation of the second stream to the first destination node; and
      propagating the first stream to the plurality of destination nodes.

4. The method of claim 1, wherein the logical point is based on a starting point of the second stream.

5. The method of claim 1, further comprising;
   halting propagation of the second stream to the first destination node;
   after halting propagation of the second stream, determining a logical point that identifies which changes made to database objects at the source node should be captured for the first stream; and
   based on the logical point, propagating the first stream to the plurality of destination nodes.

6. The method of claim 5, wherein determining the logical point includes comparing progress of applying, at the first destination node, the changes described in the second stream, with progress of applying, to at least one of the other destination nodes, the changes described in the first stream.

7. The method of claim 5, wherein determining the logical point further includes comparing acknowledge messages associated with the first stream with acknowledge messages associated with the second stream.

8. The method of claim 5, wherein determining the logical point further includes comparing a first starting point of capturing changes associated with the first stream with a second starting point of capturing changes associated with the second stream.

9. The method of claim 1, wherein the condition pertains to progress of application of the changes at the first destination node relative to progress of application of the changes to at least one of the other destination nodes.

10. A computer-implemented method comprising:
    propagating, to a first of a plurality of destination nodes in an information sharing topology, a first stream that describes changes to content in one or more database objects at a source node in the information sharing topology;
    propagating, to a second plurality of destination nodes, a second stream that describes changes to content in the one or more database objects at the source nod, wherein propagating the second stream at least partially overlaps in time with propagating said first stream;
    establishing a monitoring process to monitor progress of application of the changes to the first plurality of destination nodes, wherein application of the changes comprises, for each destination node of said first plurality of destination nodes, applying changes to one or more corresponding database objects in a database at said each destination node;
    halting propagation of the first stream to the first plurality of destination nodes in response to the monitoring process detecting a condition with respect to application of the changes at the first plurality of destination nodes;
    after halting propagation of the first stream, determining a logical point that identifies which changes made to database objects at the source node should be captured for the second stream;
    identifying changes to the database objects at the source node based on the logical point; and
    propagating, in the second stream, the identified changes to the first and second plurality of destination nodes
    wherein the method is performed by one or more computing devices.

11. The method of claim 10, wherein determining the logical point includes comparing progress of applying, to at least one of the first plurality of destination nodes, the changes described in the first stream, with progress of applying, to at least one of the second plurality of destination nodes, the changes described in the second stream.

12. The method of claim 11, wherein determining the logical point further includes comparing acknowledge messages associated with the first stream with acknowledge messages associated with the second stream.

13. The method of claim 12, wherein determining the logical point further includes comparing a first starting point of capturing changes associated with the first stream with a second starting point of capturing changes associated with the second stream.

14. The method of claim 10, wherein determining the logical point includes comparing acknowledge messages associated with the first stream with acknowledge messages associated with the second stream.

15. The method of claim 14, wherein determining the logical point further includes comparing a first starting point of capturing changes associated with the first stream with a second starting point of capturing changes associated with the second stream.

16. The method of claim 10, wherein determining the logical point includes comparing a first starting point of capturing changes associated with the first stream with a second starting point of capturing changes associated with the second stream.

17. The method of claim 10, wherein the condition pertains to progress of application of the changes to at least one of the first plurality of destination nodes relative to progress of application of the changes to at least one of the second plurality of destination nodes.

18. A non-transitory computer-readable medium storing one or more sequences of instructions which, when executed by one or more processors, causes the one or more processors to perform:
    propagating, to a plurality of destination nodes in an information sharing topology, a first stream that describes changes to content in one or more database objects at a source node in the information sharing topology;
    wherein said one or more database objects at said source node correspond to one or more database objects in a database at a destination node;
    establishing a monitoring process to monitor progress of application of the changes to the plurality of destination nodes, wherein application of the changes comprises, for each destination node of said plurality of destination nodes, applying changes to the one or more corresponding database objects in a database at said each destination node;
    in response to the monitoring process detecting a condition with respect to application of the changes at a first destination node of the plurality of destination nodes, determining a logical point that identifies which changes made to database objects at the source node should be captured for a second stream and performing the following:
       continuing to propagate the first stream to at least one node of the plurality other than the first destination node; and propagating, to the first destination node, the second stream that describes changes to the database objects at the source node.

19. The non-transitory computer-readable medium of claim 18, further comprising instructions which, when executed by the one or more processors, cause the one or more processors to perform monitoring application, at the first destination node, of the changes described by the second stream.

20. The non-transitory computer-readable medium of claim 19, wherein the condition is a first condition and further comprising instructions which, when executed by the one or more processors, cause the one or more processors to perform:
in response to detecting a second condition with respect to application, at the first node, of the changes described by the second stream, performing the following:
halting propagation of the second stream to the first destination node; and propagating the first stream to the plurality of destination nodes.

21. The non-transitory computer-readable medium of claim 18, wherein the logical point is based on a starting point of the second stream.

22. The non-transitory computer-readable medium of claim 18, further comprising instructions which, when executed by the one or more processors, cause the one or more processors to perform:
halting propagation of the second stream to the first destination node;
after halting propagation of the second stream, determining a logical point that identifies which changes made to database objects at the source node should be captured for the first stream; and
based on the logical point, propagating the first stream to the plurality of destination nodes.

23. The non-transitory computer-readable medium of claim 22, wherein instructions for determining the logical point include instructions for comparing progress of applying, at the first destination node, the changes described in the second stream, with progress of applying, to at least one of the other destination nodes, the changes described in the first stream.

24. The non-transitory computer-readable medium of claim 22, wherein instructions for determining the logical point include instructions for comparing acknowledge messages associated with the first stream with acknowledge messages associated with the second stream.

25. The non-transitory computer-readable medium of claim 22, wherein instructions for determining the logical point include instructions for comparing a first starting point of capturing changes associated with the first stream with a second starting point of capturing changes associated with the second stream.

26. The non-transitory computer-readable medium of claim 18, wherein the condition pertains to progress of application of the changes at the first destination node relative to progress of application of the changes to at least one of the other destination nodes.

27. A non-transitory computer-readable medium storing one or more sequences of instructions which, when executed by one or more processors, causes the one or more processors to perform:
propagating, to a first of a plurality of destination nodes in an information sharing topology, a first stream that describes changes to content in one or more database objects at a source node in the information sharing topology;
propagating, to a second plurality of destination nodes, a second stream that describes changes to content in the one or more database objects at the source node, wherein propagating the second stream at least partially overlaps in time with propagating said first stream;
establishing a monitoring process to monitor progress of application of the changes to the first plurality of destination nodes, wherein application of the changes comprises, for each destination node of said first plurality of destination nodes, applying changes to one or more corresponding database objects in a database at said each destination node;
halting propagation of the first stream to the first plurality of destination nodes in response to the monitoring process detecting a condition with respect to application of the changes at the first plurality of destination nodes;
after halting propagation of the first stream, determining a logical point that identifies which changes made to database objects at the source node should be captured for the second stream;
identifying changes to the database objects at the source node based on the logical point; and
propagating, in the second stream, the identified changes to the first and second plurality of destination nodes.

28. The non-transitory computer-readable medium of claim 27, wherein instructions for determining the logical point include instructions for comparing progress of applying, to at least one of the first plurality of destination nodes, the changes described in the first stream, with progress of applying, to at least one of the second plurality of destination nodes, the changes described in the second stream.

29. The non-transitory computer-readable medium of claim 28, wherein instructions for determining the logical point include instructions for comparing acknowledge messages associated with the first stream with acknowledge messages associated with the second stream.

30. The non-transitory computer-readable medium of claim 29, wherein instructions for determining the logical point include instructions for comparing a first starting point of capturing changes associated with the first stream with a second starting point of capturing changes associated with the second stream.

31. The non-transitory computer-readable medium of claim 27, wherein instructions for determining the logical point include instructions for comparing acknowledge messages associated with the first stream with acknowledge messages associated with the second stream.

32. The non-transitory computer-readable medium of claim 31, wherein instructions for determining the logical point include instructions for comparing a first starting point of capturing changes associated with the first stream with a second starting point of capturing changes associated with the second stream.

33. The non-transitory computer-readable medium of claim 27, wherein instructions for determining the logical point include instructions for comparing a first starting point of capturing changes associated with the first stream with a second starting point of capturing changes associated with the second stream.

34. The non-transitory computer-readable medium of claim 27, wherein the condition pertains to progress of application-of the changes to at least one of the first plurality of destination nodes relative to progress of application of the changes to at least one of the second plurality of destination nodes.

* * * * *

UNITED STATES PATENT AND TRADEMARK OFFICE
CERTIFICATE OF CORRECTION

| | | |
|---|---|---|
| PATENT NO. | : 7,899,785 B2 | Page 1 of 1 |
| APPLICATION NO. | : 11/831798 | |
| DATED | : March 1, 2011 | |
| INVENTOR(S) | : Yuan et al. | |

It is certified that error appears in the above-identified patent and that said Letters Patent is hereby corrected as shown below:

In column 3, line 31, after "invention" insert -- . --.

In column 6, line 44, delete "dequeueing" and insert -- dequeuing --, therefor.

In column 13, line 7, delete "B." and insert -- b. --, therefor.

In column 21, line 48, in Claim 10, delete "nod," and insert -- node, --, therefor.

In column 23, line 18-20, in Claim 20, delete "halting propagation of the second stream to the first destination node; and propagating the first stream to the plurality of destination nodes." and insert -- halting propagation of the second stream to the first destination node; and propagating the first stream to the plurality of destination nodes. --, therefor.

Signed and Sealed this
Eighteenth Day of October, 2011

David J. Kappos
*Director of the United States Patent and Trademark Office*